(12) United States Patent
Howard

(10) Patent No.: US 9,339,736 B2
(45) Date of Patent: May 17, 2016

(54) SYSTEMS AND METHODS FOR COLLAPSIBLE STRUCTURE APPLICATIONS

(71) Applicant: T. Dashon Howard, Lafayette Hill, PA (US)

(72) Inventor: T. Dashon Howard, Lafayette Hill, PA (US)

( * ) Notice: Subject to any disclaimer, the term of this patent is extended or adjusted under 35 U.S.C. 154(b) by 0 days.

(21) Appl. No.: 14/245,249

(22) Filed: Apr. 4, 2014

(65) Prior Publication Data
US 2015/0283474 A1    Oct. 8, 2015

(51) Int. Cl.
 A63H 33/08 (2006.01)
 A63H 33/04 (2006.01)
 A63F 9/12 (2006.01)
 E04B 1/343 (2006.01)

(52) U.S. Cl.
 CPC ............ A63H 33/046 (2013.01); A63F 9/1208 (2013.01); E04B 1/34357 (2013.01); A63F 2009/1212 (2013.01); A63F 2009/1244 (2013.01); A63F 2009/1296 (2013.01)

(58) Field of Classification Search
 USPC ............... 446/85, 91, 92, 108, 109, 111, 112, 446/115, 124, 128, 388, 487
 See application file for complete search history.

(56) References Cited

U.S. PATENT DOCUMENTS

| | | | |
|---|---|---|---|
| 1,292,188 A * | 1/1919 | Wheeler | 446/85 |
| 2,688,820 A | 9/1954 | Shemet | |
| 2,843,971 A | 7/1958 | Gardellin | |
| 3,359,657 A * | 12/1967 | Hedberg | 434/211 |
| 3,564,758 A * | 2/1971 | Willis | 446/109 |
| 3,654,375 A | 4/1972 | Geiger | |
| 3,655,201 A | 4/1972 | Nichols | |
| 3,662,486 A | 5/1972 | Freedman | |
| 3,666,607 A * | 5/1972 | Weissman | 428/33 |
| 3,728,201 A | 4/1973 | Stroehmer | |
| 3,782,029 A | 1/1974 | Bardot | |
| 3,785,066 A | 1/1974 | Tuitt | |

(Continued)

FOREIGN PATENT DOCUMENTS

BE  898431 A1  6/1984
CA  2214697 A1  6/1998

(Continued)

OTHER PUBLICATIONS

"U.S. Appl. No. 14/029,630, Non Final Office Action mailed Feb. 23, 2015", 7 pgs.

(Continued)

Primary Examiner — Kurt Fernstrom
(74) Attorney, Agent, or Firm — Schwegman Lundberg & Woessner, P.A.

(57) ABSTRACT

Collapsible structures may be formed from planar solids. The structures may be comprised of multiple planar objects hingedly connected, where each planar object may include magnetic materials (e.g., magnets, ferromagnetic metals) or electromagnetic materials. Using the magnetic or electromagnetic materials, the connected planar objects may be arranged as a single planar object with multiple layers, or may be arranged as a three-dimensional (3-D) object, where the magnetic or electromagnetic materials may be used to retain the formed 3-D object shape. Application of a current to the electromagnetic materials may cause the collapsible structure to form the 3-D object, and removal of the electric current may cause the collapsible structure to revert to a single planar object. Multiple structures may be combined to form larger structures.

20 Claims, 16 Drawing Sheets

(56) References Cited

U.S. PATENT DOCUMENTS

| | | | |
|---|---|---|---|
| 4,026,087 A | | 5/1977 | White |
| 4,064,662 A | | 12/1977 | O'toole |
| 4,258,479 A | | 3/1981 | Roane |
| 4,380,133 A | * | 4/1983 | Arnstein ................. 446/488 |
| 4,492,723 A | | 1/1985 | Chadwick, II |
| 4,864,796 A | | 9/1989 | Diamond |
| 5,104,125 A | * | 4/1992 | Wilson ................. 273/157 R |
| 5,108,100 A | | 4/1992 | Essebaggers et al. |
| 5,205,556 A | * | 4/1993 | Stallman ................. 273/157 R |
| 5,429,515 A | | 7/1995 | Greenwood |
| 5,489,230 A | * | 2/1996 | Gavula, Jr. ................. 446/109 |
| 5,895,306 A | * | 4/1999 | Cunningham ................. 446/108 |
| 5,961,365 A | * | 10/1999 | Lambert ................. 446/125 |
| 6,264,199 B1 | | 7/2001 | Schaedel |
| 6,293,800 B1 | | 9/2001 | Robertson |
| D457,833 S | * | 5/2002 | Juan et al. ................. D11/121 |
| 6,431,936 B1 | | 8/2002 | Kiribuchi |
| 6,443,796 B1 | | 9/2002 | Shackelford |
| 6,524,161 B1 | | 2/2003 | Asami |
| 6,585,553 B1 | | 7/2003 | Fetridge et al. |
| 6,749,480 B1 | | 6/2004 | Hunts |
| 6,895,722 B1 | | 5/2005 | Ponder |
| 7,018,690 B2 | * | 3/2006 | Lee ................. 428/36.5 |
| 7,708,615 B2 | | 5/2010 | Munch |
| 8,047,889 B2 | | 11/2011 | Ishii |
| D660,685 S | | 5/2012 | Bucci |
| 8,398,268 B2 | | 3/2013 | Elberbaum et al. |
| 8,507,778 B2 | | 8/2013 | Olson |
| 8,753,164 B2 | | 6/2014 | Hansen et al. |
| 8,911,275 B2 | | 12/2014 | Maddocks et al. |
| 8,979,608 B2 | * | 3/2015 | Hawthorne ................. 446/109 |
| 9,168,465 B2 | | 10/2015 | Howard |
| 2001/0021619 A1 | | 9/2001 | Forkman |
| 2001/0041493 A1 | | 11/2001 | Esterle |
| 2003/0153243 A1 | | 8/2003 | Haas |
| 2006/0252340 A1 | | 11/2006 | Bach et al. |
| 2007/0037469 A1 | | 2/2007 | Yoon |
| 2008/0073999 A1 | | 3/2008 | Wischnewskij et al. |
| 2009/0309302 A1 | | 12/2009 | Langin-Hooper |
| 2011/0001394 A1 | | 1/2011 | Dalla Piazza |
| 2011/0043079 A1 | | 2/2011 | Shirai et al. |
| 2012/0122059 A1 | | 5/2012 | Schweikardt et al. |
| 2013/0165012 A1 | | 6/2013 | Klauber et al. |
| 2013/0217294 A1 | | 8/2013 | Karunaratne |
| 2014/0227934 A1 | | 8/2014 | Rudisill |
| 2015/0079870 A1 | | 3/2015 | Howard |
| 2015/0079871 A1 | | 3/2015 | Howard |
| 2015/0079872 A1 | | 3/2015 | Howard |

FOREIGN PATENT DOCUMENTS

| | | |
|---|---|---|
| CN | 201643725 U | 11/2010 |
| DE | 19617526 A1 | 5/1997 |
| EP | 0261753 A2 | 3/1988 |
| FR | 2114528 A5 | 6/1972 |
| GB | 1603060 A | 11/1981 |
| GB | 2302344 A | 1/1997 |
| KR | 200454067 Y1 | 6/2011 |
| WO | WO-9535142 A1 | 12/1995 |
| WO | WO-2006040852 A1 | 4/2006 |
| WO | WO-2008043535 A1 | 4/2008 |
| WO | WO-2015042172 A1 | 3/2015 |
| WO | WO-2015077760 A1 | 5/2015 |
| WO | WO-2015116928 A1 | 8/2015 |
| WO | WO2015153827 | 10/2015 |

OTHER PUBLICATIONS

"U.S. Appl. No. 14/029,630, Non Final Office Action mailed Oct. 7, 2014", 5 pgs.

"U.S. Appl. No. 14/029,630, Response filed Jan. 7, 2015 to Non Final Office Action mailed Oct. 7, 2014", 6 pgs.

"U.S. Appl. No. 14/089,599, Non Final Office Action mailed Feb. 23, 2015", 9 pgs.

"U.S. Appl. No. 14/089,599, Response filed Dec. 22, 2014 to Restriction Requirement mailed Oct. 22, 2014", 6 pgs.

"U.S. Appl. No. 14/089,599, Restriction Requirement mailed Oct. 22, 2014", 6 pgs.

"International Application Serial No. PCT/US2014/056130, International Search Report mailed Nov. 27, 2014", 5 pgs.

"International Application Serial No. PCT/US2014/056130, Written Opinion mailed Nov. 27, 2014", 5 pgs.

"Ball of Whacks", [online], © 1996-2013, Amazon.com, Inc. [archived on Sep. 1, 2013]. Retrieved from the Internet: <URL: https://web.archive.org/web/20130901214911/http://www.amazon.com/Creative-Whack-BOW30-Ball-Whacks/dp/0911121013>, (2013), 5 pgs.

"Magna-Tiles Clear Colors 32 piece set", [online]. © 1996-2013, Amazon.com, Inc. [archived on Sep. 8, 2013]. Retrieved from the Internet: <http://www.amazon.com/Magna-Tiles-Clear-Colors-piece-set/dp/B000CBSNKQ/>, (2013), 5 pgs.

"Toy / Game Popular Playthings Mag-Blocks", [online]. © 1996-2014, Amazon.com, Inc. [retrieved on Apr. 28, 2014], Retrieved from the Internet: <URL: http://www.amazon.com/Game-Popular-Playthings-Mag-Blocks-Easy-To-Handle/dp/B00CGG75JA/>, (2014), 3 pgs.

"U.S. Appl. No. 14/029,630, Notice of Allowance mailed May 8, 2015", 5 pgs.

"U.S. Appl. No. 14/029,630, Notice of Allowance mailed Jul. 8, 2015", 5 pgs.

"U.S. Appl. No. 14/029,630, Response filed Feb. 27, 2015 to Non Final Office Action mailed Feb. 23, 2015", 9 pgs.

"U.S. Appl. No. 14/089,599, Notice of Allowance mailed Apr. 2, 2015", 6 pgs.

"U.S. Appl. No. 14/089,599, Response filed Mar. 13, 2015 to Non Final Office Action mailed Feb. 23, 2015", 7 pgs.

"U.S. Appl. No. 14/170,372, Non Final Office Action mailed May 18, 2015", 7 pgs.

"U.S. Appl. No. 14/170,372, Notice of Allowance mailed Oct. 8, 2015", 7 pgs.

"U.S. Appl. No. 14/170,372, Response filed Apr. 23, 2015 to Restriction Requirement mailed Feb. 26, 2015", 6 pgs.

"U.S. Appl. No. 14/170,372, Response filed Aug. 18, 2015 to Non Final Office Action mailed May 18, 2015", 8 pgs.

"U.S. Appl. No. 14/170,372, Restriction Requirement mailed Feb. 26, 2015", 5 pgs.

"U.S. Appl. No. 14/539,829, Restriction Requirement mailed Oct. 1, 2015", 8 pgs.

"International Application Serial No. PCT/US2014/056130, International Preliminary Report on Patentability mailed Sep. 30, 2015", 6 pgs.

"International Application Serial No. PCT/US2014/067330, International Search Report mailed Feb. 17, 2015", 4 pgs.

"International Application Serial No. PCT/US2014/067330, Written Opinion mailed Feb. 17, 2015", 7 pgs.

"International Application Serial No. PCT/US2015/013766 International Preliminary Report on Patentability", 10 pgs.

"International Application Serial No. PCT/US2015/013766, International Search Report mailed May 11, 2015", 4 pgs.

"International Application Serial No. PCT/US2015/013766, Written Opinion mailed May 11, 2015", 5 pgs.

"International Application Serial No. PCT/US2015/023973, International Search Report mailed Jun. 18, 2015", 4 pgs.

"International Application Serial No. PCT/US2015/023973, Written Opinion mailed Jun. 18, 2015", 5 pgs.

* cited by examiner

SYSTEMS AND METHODS FOR COLLAPSIBLE STRUCTURE APPLICATIONS

CROSS-REFERENCE TO RELATED APPLICATIONS

The present application claims priority to U.S. Patent Application filed Sep. 17, 2013 and assigned Ser. No. 14/029,630, to U.S. Patent Application filed Nov. 25, 2013 and assigned Ser. No. 14/089,599, and to U.S. Patent Application filed Jan. 31, 2014 and assigned Ser. No. 14/170,372, the entire disclosures of which are incorporated herein by reference.

FIELD

The present invention relates to collapsible structures, and specifically to magnetic educational collapsible structures.

BACKGROUND

Planar geometric structures may be assembled in various configurations to form different three-dimensional (3-D) geometric structures, and may be collapsed into substantially planar configurations. The structures may be used as an educational toy by children, or may be used by adults or children to explore various two-dimensional or three-dimensional shapes.

DETAILED DESCRIPTION

Collapsible structures may be formed from planar solids. The structures may be comprised of multiple planar objects hingedly connected, where each planar object may include magnetic materials (e.g., magnets, ferromagnetic metals) or electromagnetic materials. Using the magnetic or electromagnetic materials, the connected planar objects may be arranged as a single planar object with multiple layers, or may be arranged as a three-dimensional (3-D) object, where the magnetic or electromagnetic materials may be used to retain the formed 3-D object shape. Application of a current to the electromagnetic materials may cause the collapsible structure to form the 3-D object, and removal of the electric current may cause the collapsible structure to revert to a single planar object. Multiple structures may be combined to form larger structures.

Collapsible structures may be formed from one or more basic polygons or other shapes. Collapsible structures may include magnetic materials (e.g., magnets, ferromagnetic metals), piezoelectric materials, or lights (e.g., LEDs). Collapsible structures may be combined to form or give the appearance of various geometric structures, and the included magnetic materials may be used to retain the formed geometric structure shape. A collapsible structure may be formed from six pentagons, and may be referred to as a "lynch pin" structure.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

Figure 1:
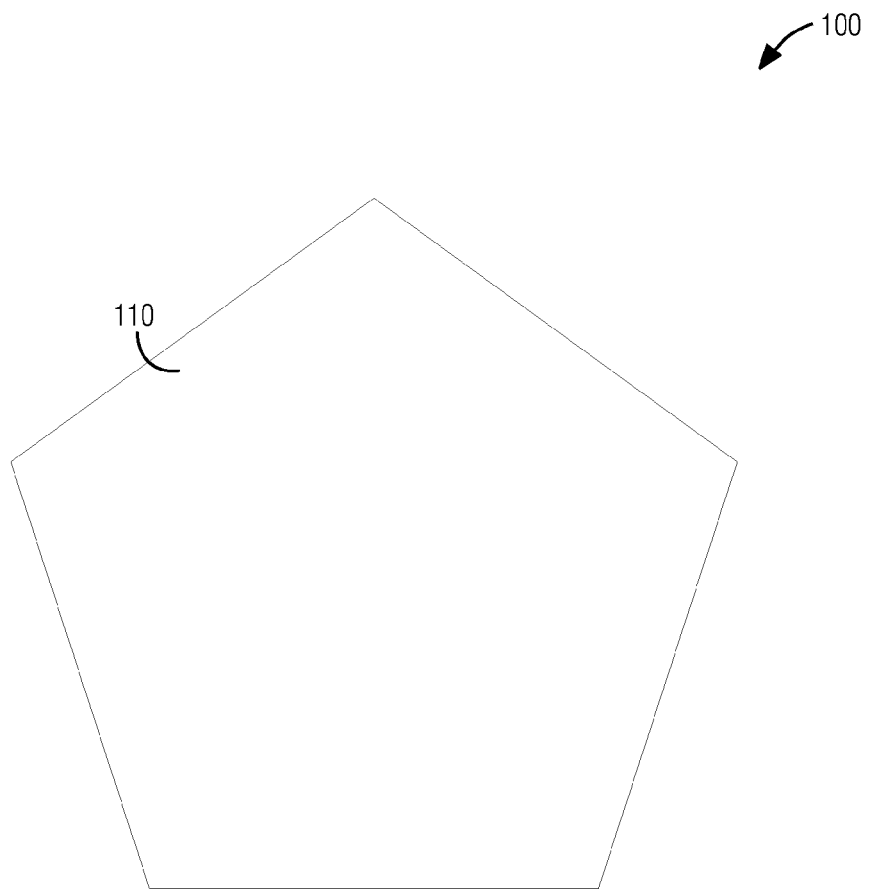
FIG. 1 is a front view of a planar shape that may be used to form a collapsible structure.

FIG. 1 is a front view of a planar shape 100 that may be used to form a collapsible structure, according to an embodiment. The planar shape may be a regular polygon, such as the regular pentagon 110. In some embodiments, the planar shape may be substantially two-dimensional. In other embodiments, the planar shape edges include various features that allow two or more planar shapes to connect to each other.

Figure 2A:
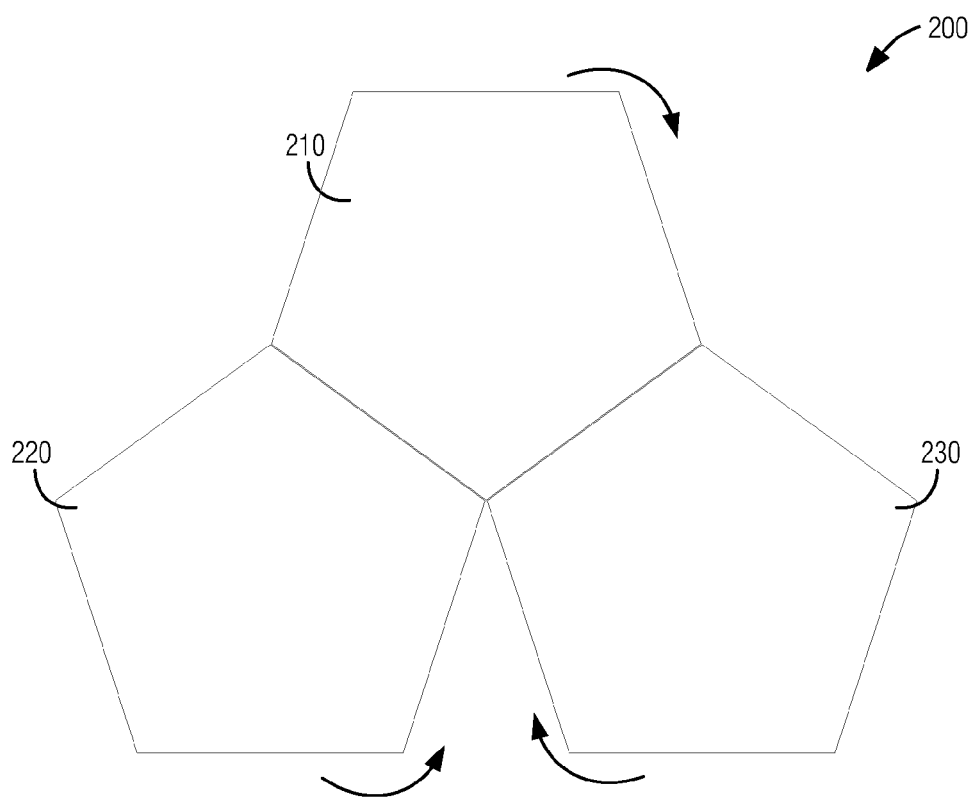
FIGS. 2A-2B are front and perspective views of three planar shapes joined on different sides to form a 3-D geometric structure.
Figure 2B:
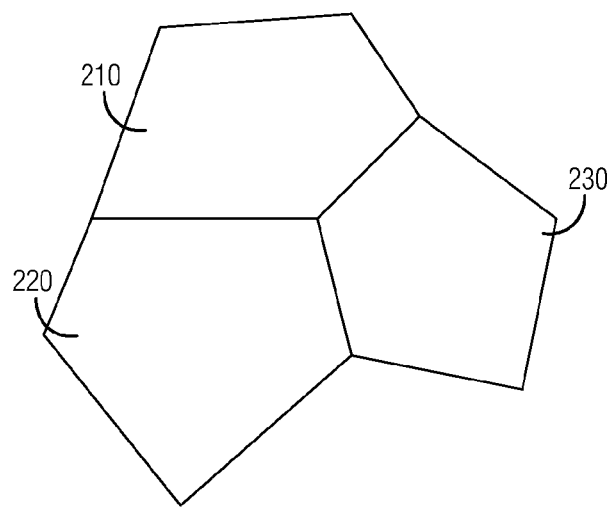

FIGS. 2A-2B are front and perspective views of three planar shapes joined on different sides to form a 3-D geometric structure 200, according to an embodiment. The planar shapes may include three regular pentagons 210, 220, and 230. Two or more of the pentagons may be attached on a side to form a hinge, such as is shown in FIG. 2A. Each hinge may be constructed using a flexible material or a mechanical hinge. In some embodiments, one or more of the planar shapes may be collapsed (e.g., closed) toward each other, and may form a 3-D shape. For example, pentagons 220 and 230 shown in FIG. 2A may be folded toward each other to form the 3-D shape shown in FIG. 2B. In other embodiments, one or more of the planar shapes may be collapsed (e.g., closed) toward each other to become flush (e.g., coplanar) to form a multiple layer, substantially planar object. For example, pentagons 220 and 230 shown in FIG. 2A may be folded toward each other to form a single, three-layer pentagon.

Figure 3A:
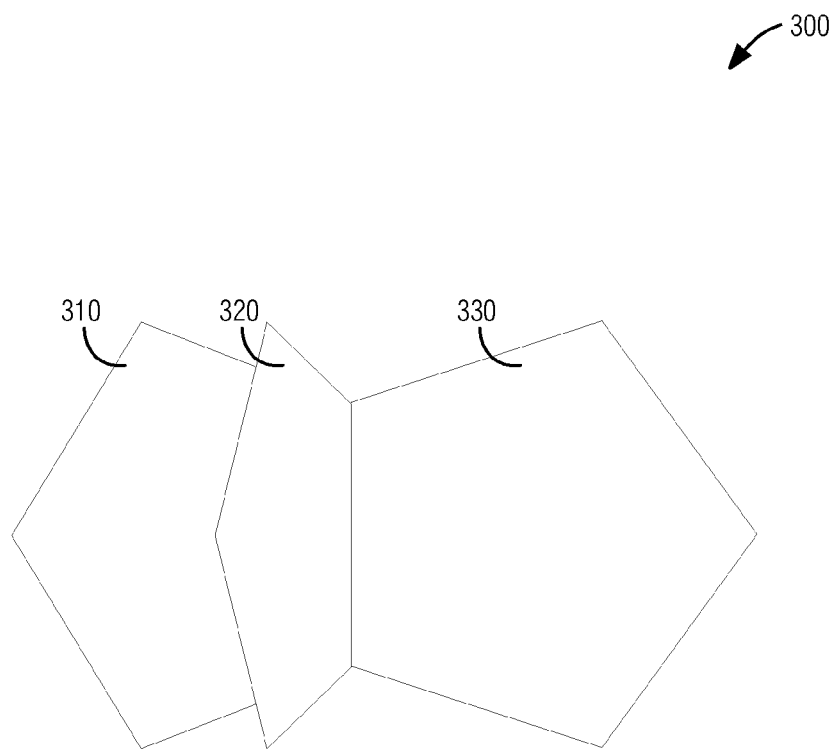
FIGS. 3A-3B are front and perspective views of three planar shapes joined on a single side to form a 3-D geometric structure.
Figure 3B:
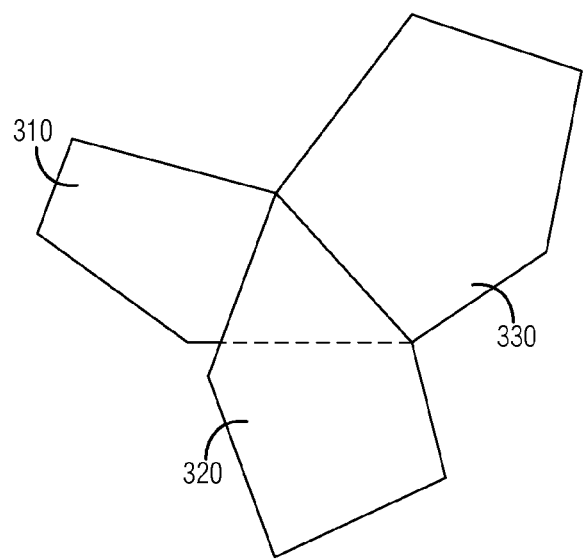

FIGS. 3A-3B are front and perspective views of three planar shapes joined on a single side to form a 3-D geometric structure 300, according to an embodiment. The planar shapes may include three regular pentagons 310, 320, and 330. The planar shapes may be joined on a common edge to form a 3-D structure, such as is shown in FIGS. 3A-3B.

Figure 4A:
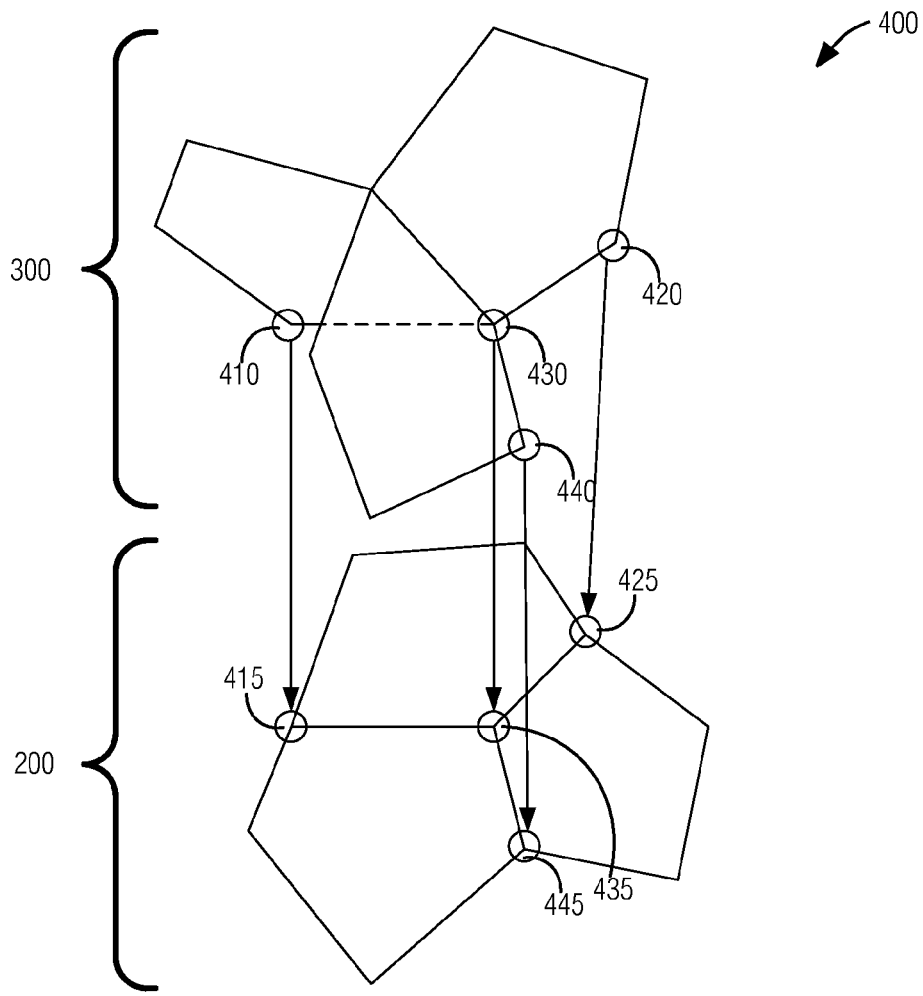
FIGS. 4A-4B are perspective views of combining two 3-D geometric structures to form a larger 3-D geometric structure.
Figure 4B:
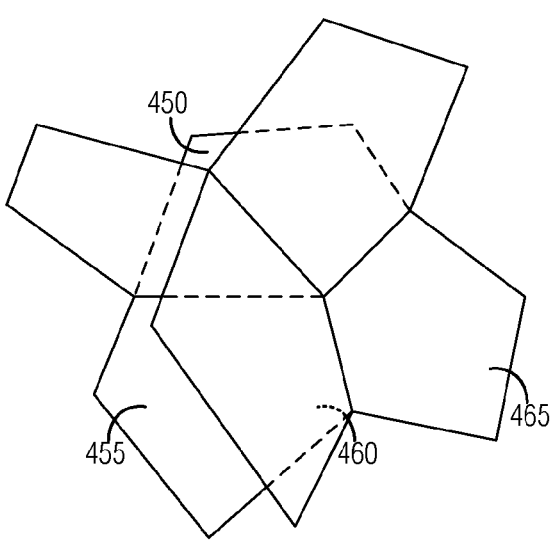

FIGS. 4A-4B are perspective views of combining two 3-D geometric structures to form a larger 3-D geometric structure 400, according to an embodiment. Two 3-D geometric structures may be joined together to form a larger 3-D geometric structure. In an example, the 3-D geometric structure 300 shown in FIG. 3B may be attached to the 3-D geometric structure 200 shown in FIG. 2B. In this example, point 410 may be joined to point 415, point 420 may be joined to point 425, point 430 may be joined to point 435, and point 440 may be joined to point 445 to form a six-sided 3-D geometric structure 400 shown in FIG. 4B.

The six-sided 3-D geometric structure 400 shown in FIG. 4B may include four pyramidal inner spaces 450, 455, 460, and 466. Each pyramidal inner space may be shaped similar to the 3-D shape shown in FIG. 2B. The planar pentagonal surfaces may include magnetic materials or electrically conductive lines, and may be used to create or modify a magnetic field or an electric field. The magnetic or electric field may have an associated resonance. The magnetic or electric field may be created or modified for the entire six-sided 3-D geometric structure 400, or the magnetic or electric field may be created or modified separately for each of the four pyramidal inner spaces 450, 455, 460, and 466.

Power may be provided to the electrically conductive planar shapes through a power storage element (e.g., capacitor, battery) or through a power-generating element (e.g., solar cell, piezoelectric component). For example, a piezoelectric component may be used to convert sound into electricity, and the electricity may be used to create an electric field around one or more of the four pyramidal inner spaces 450, 455, 460, and 466.

Various sides may be joined using hinges, and may be collapsed toward each other to form a multiple layer, substantially planar object. Various sides may be held in a fixed position using magnetic or electromagnetic materials. For example, a multiple layer, substantially planar object may be manually arranged into the six-sided 3-D geometric structure 400 shown in FIG. 4B. Various sides may be moved into a selected position using magnetic or electromagnetic materials. For example, applying a magnetic or electromagnetic field to a multiple layer, substantially planar object may cause the object to be arranged into the six-sided 3-D geometric structure 400 shown in FIG. 4B.

Figure 5A:
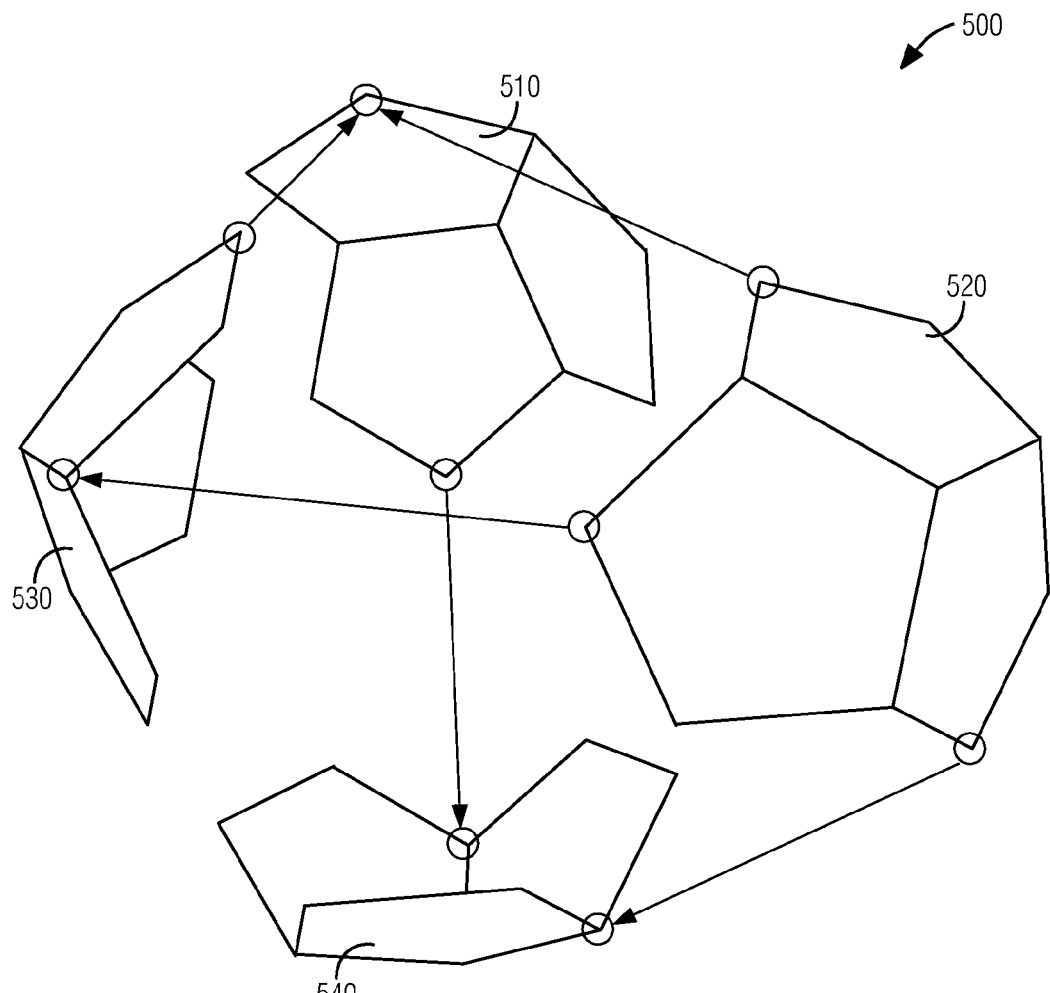
FIGS. 5A-5B are perspective views of combining four 3-D geometric structures to form a dodecahedron.
Figure 5B:
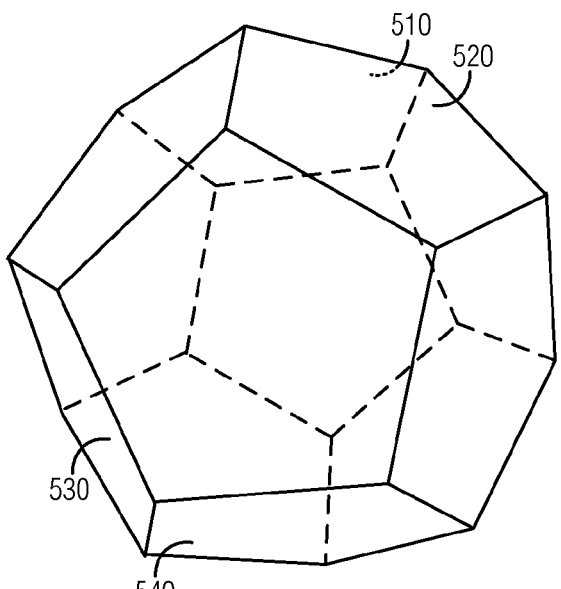

FIGS. 5A-5B are perspective views of combining four 3-D geometric structures to form a dodecahedron 500, according to an embodiment. Four 3-D geometric structures may be joined together to form a larger 3-D geometric structure. For example, a dodecahedron may be formed by combining twelve regular pentagons. Each of the 3-D geometric structures shown in FIG. 2B includes three connected pentagons, as shown in various orientations in FIG. 5A as 510, 520, 530, and 540. Four of these structures may be combined to form a twelve-sided dodecahedron as shown in FIG. 5B.

Figure 6:
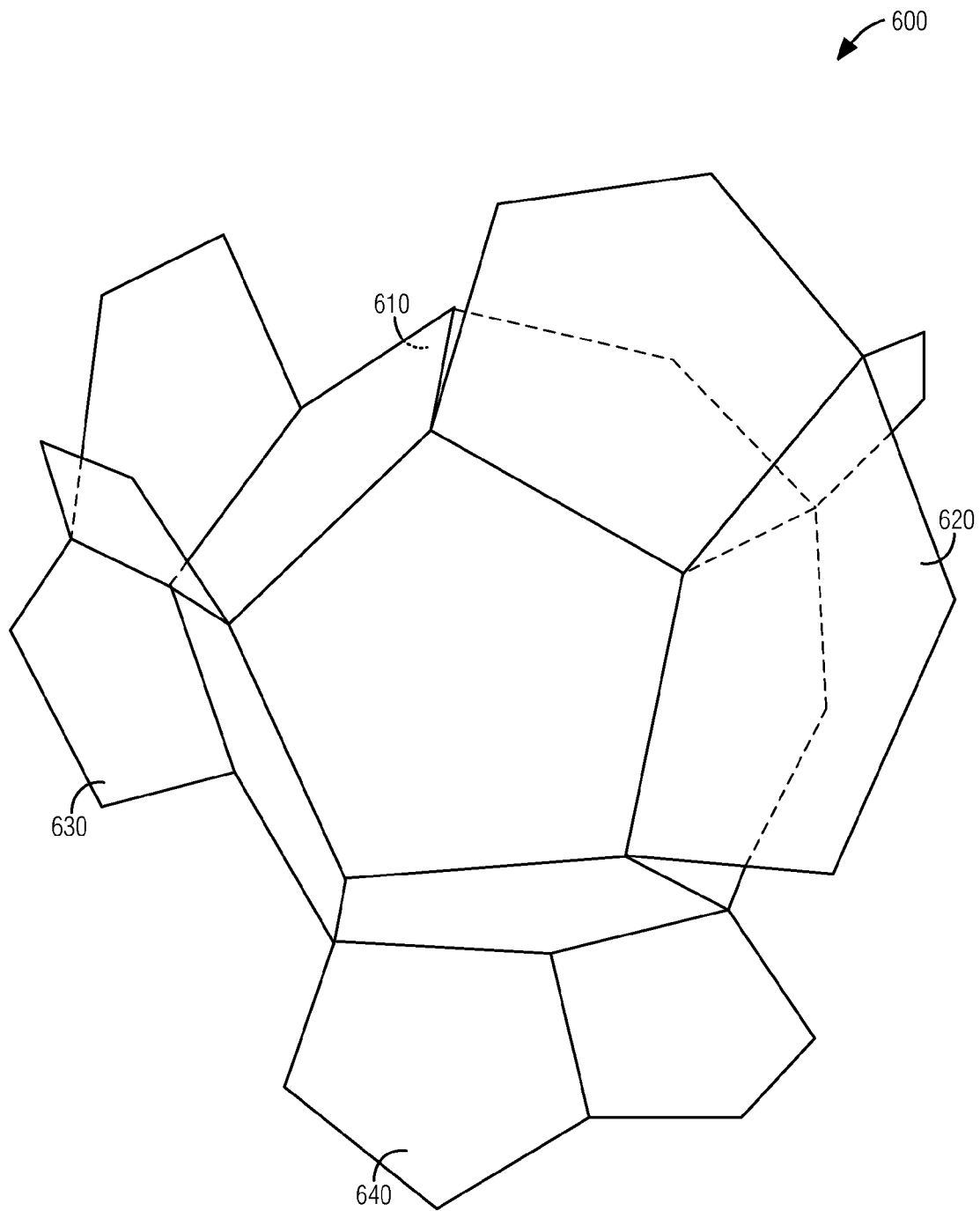
FIG. 6 is a perspective view of a modified dodecahedron formed from four collapsible structures.

FIG. 6 is a perspective view of a modified dodecahedron 600 formed from four collapsible structures, according to an embodiment. A dodecahedron may include one or more collapsible surfaces. Instead of forming a dodecahedron as described and shown with respect to FIGS. 5A-5B, a dodecahedron may be formed from four of the six-sided 3-D geometric structures shown in FIG. 4B, as shown in various orientations in FIGS. 6 as 610, 620, 630, and 640. Various surfaces may be moved into a selected position using magnetic or electromagnetic materials. For example, applying a magnetic or electromagnetic field may cause the object to be arranged into the modified dodecahedron 600 shown in FIG. 6. Each modified dodecahedron 600 may be used as a building block, and the planar surfaces extending beyond the twelve-sided dodecahedron surface may be used to combine two or more modified dodecahedrons 600.

Figure 7:
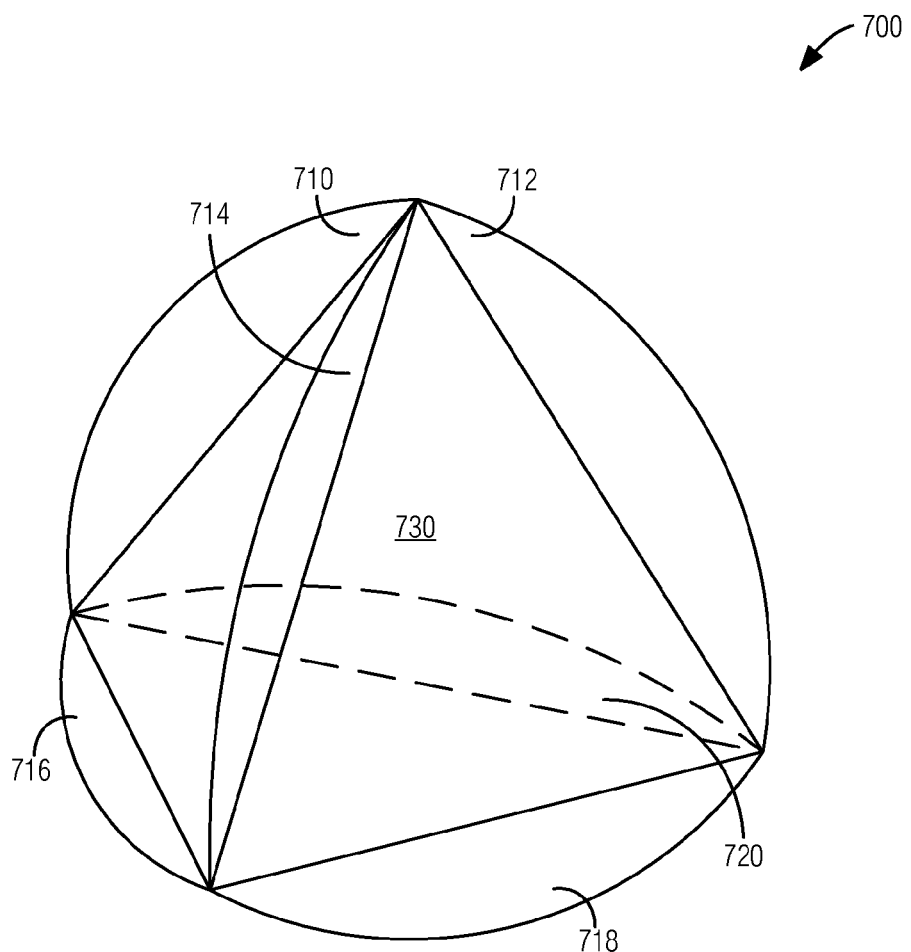
FIG. 7 is a perspective view of a tetrahedral building block.

FIG. 7 is a perspective view of a tetrahedral building block 700. The tetrahedral building block 700 may include four connected circular faces. The flanges of four such circular faces may be connected to form tetrahedral flanges 710, 712, 716, 718, and 720. The circular faces may be connected such that the flanges 710, 712, 716, 718, and 720 are flat, and the triangles inscribed in each of the four connected circular faces may form a tetrahedral inner space 730. In other embodiments, the circular faces may be connected at or near the circumference of each circular face such that the flanges 710, 712, 716, 718, and 720 define an inner volume (e.g., inner pocket). The outermost arcuate portions of the tetrahedral flanges 710, 712, 716, 718, and 720 may define a spherical volume that corresponds with the circumscribed sphere (e.g., circumsphere) surrounding the tetrahedral inner space 730.

The tetrahedral building block 700 may be transparent, may be translucent, may include a semi-transparent material comprised of a color, or may include a solid (e.g., opaque) material. The tetrahedral inner space 730 may include one or more gasses, such as noble gasses or gasses that are translucent or colored. The tetrahedral inner space 730 may include one or more fluids (e.g., gasses or liquids). The fluid may be selected according to its response to solar heating. For example, a fluid may expand in response to solar heating and cause the flanges to open. In another example, a fluid with a high heat capacity may store energy received from solar heating, such as in concentrated solar power applications. The fluid may be selected according to its ability to change color or light absorption. For example, a suspended particle fluid may transition from a clouded appearance to a translucent appearance in the presence of an electrical voltage. Various levels of transparency or various shades of color may be used for the each side of the tetrahedral inner space 730 or for each of the tetrahedral flanges 710, 712, 716, 718. The use of semi-transparent materials of various colors may allow the colors to be combined depending on orientation. For example, if the device is held so a blue face is superimposed on a yellow face, the object may appear green. Similarly, multiple tetrahedral building blocks 700 may be combined to yield various colors. Multiple tetrahedral building blocks 700 may be combined to form the appearance of various platonic solids, where the platonic solid appearance may depend on each tetrahedral building block's specific periodicities of motion and wave positions in time as indicated by the direction of particular intersecting linear projections. For example, the vertices of four tetrahedral building blocks 700 using tetrahedral configurations may be combined to form a larger tetrahedron, where the larger tetrahedron maintains the one hundred and twenty degree angle at each of its vertices. Multiple tetrahedral building blocks 700 may be combined to form various other building blocks, such as is shown in FIGS. 12-16.

Figure 8:
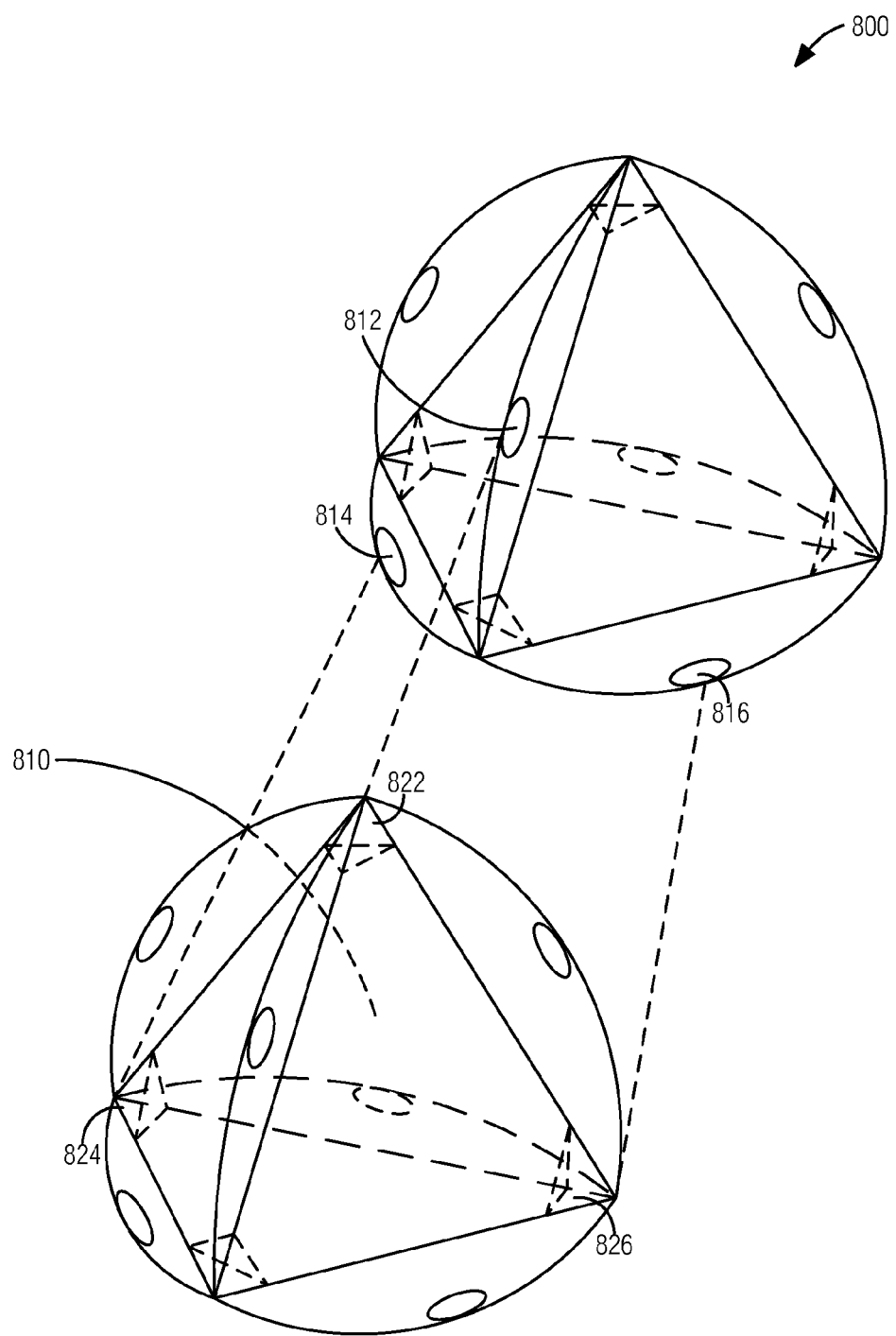
FIG. 8 is a perspective view of two tetrahedral building blocks nested together.

FIG. 8 is a perspective view 800 of two tetrahedral building blocks nested together. At least one tetrahedral surface may be collapsed or removed, such as surface 810. Two or more tetrahedral building blocks 700 may be nested, and may be connected at one or more connection points via mechanical, magnetic, or by other means. For example, magnetic flange 812 may adhere to magnetic tetrahedral inner space 822, flange 814 may adhere to space 824, and flange 816 may adhere to space 826. Multiple tetrahedral building blocks 700 may be nested on one or more of the four tetrahedral vertices as shown in FIGS. 9A-9B.

Figure 9A:
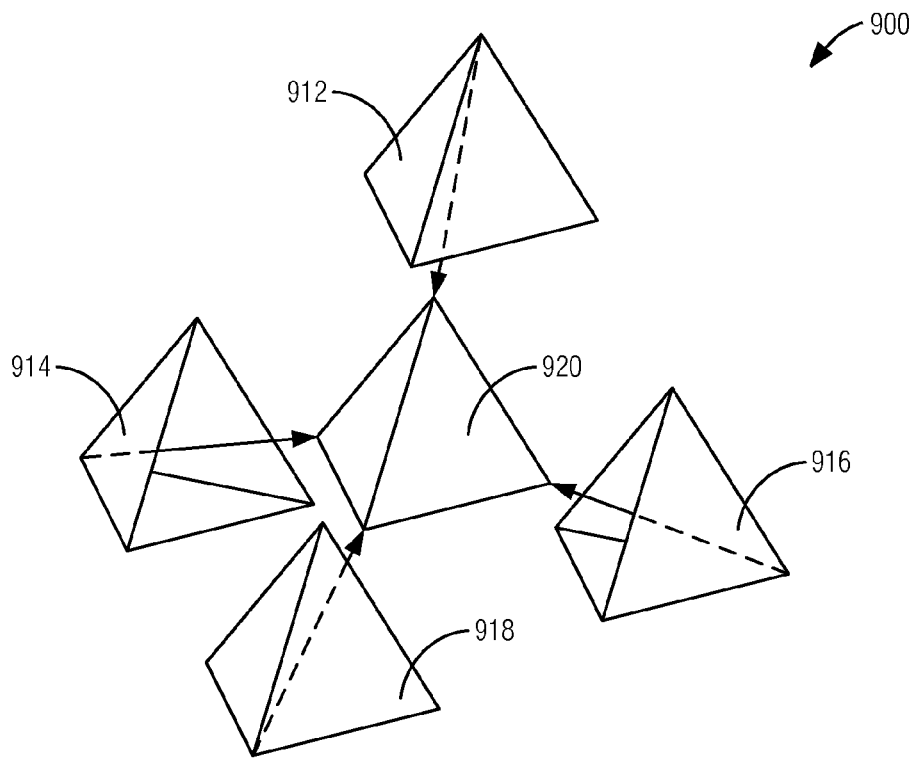
FIGS. 9A-9B are perspective views of combining four tetrahedral building blocks at separate corners.
Figure 9B:
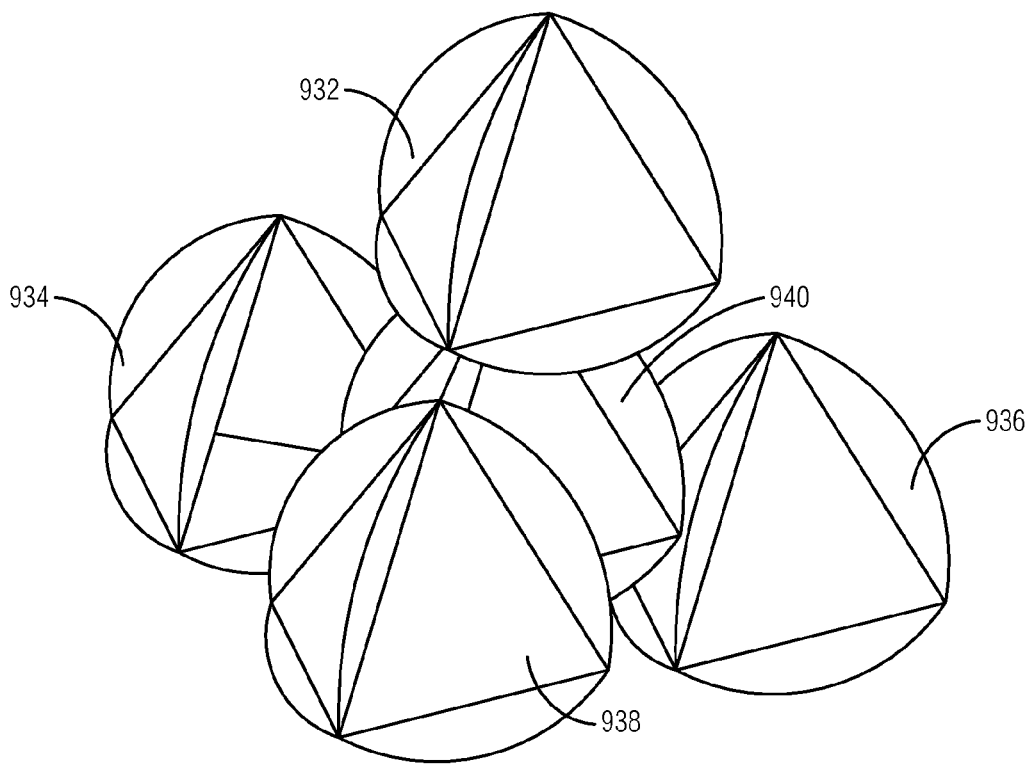

FIGS. 9A-9B are perspective views of combining four tetrahedral building blocks at separate corners 900. FIG. 9A shows a simplified version of four tetrahedral shapes (e.g., pyramids) with collapsed sides 912, 914, 916, and 918, and one base tetrahedral shape 920 with no collapsed sides. In an example, three of the four tetrahedral shapes 914, 916, 918 are nested on the bottom three vertices of the base tetrahedral shape 920 to form a tripod configuration, and one tetrahedral shape 912 may be nested on the top vertex of the base tetrahedral shape 920. FIG. 9B shows an analogous configuration using tetrahedral building blocks, including four tetrahedral building blocks with collapsed sides 932, 934, 936, and 938, and one base tetrahedral building block 940 with no collapsed sides. In an example, three of the four tetrahedral building blocks 934, 936, and 938 are nested on the three bottom three vertices of the base tetrahedral building block 940 to form a tripod configuration, and one tetrahedral building block 932 may be nested on the top vertex of the base tetrahedral building block 940. Additional tetrahedral building blocks with collapsed sides may be added on to each of the four tetrahedral building blocks with collapsed sides 932, 934, 936, and 938 to form larger structures, as shown in FIG. 10.

Figure 10:
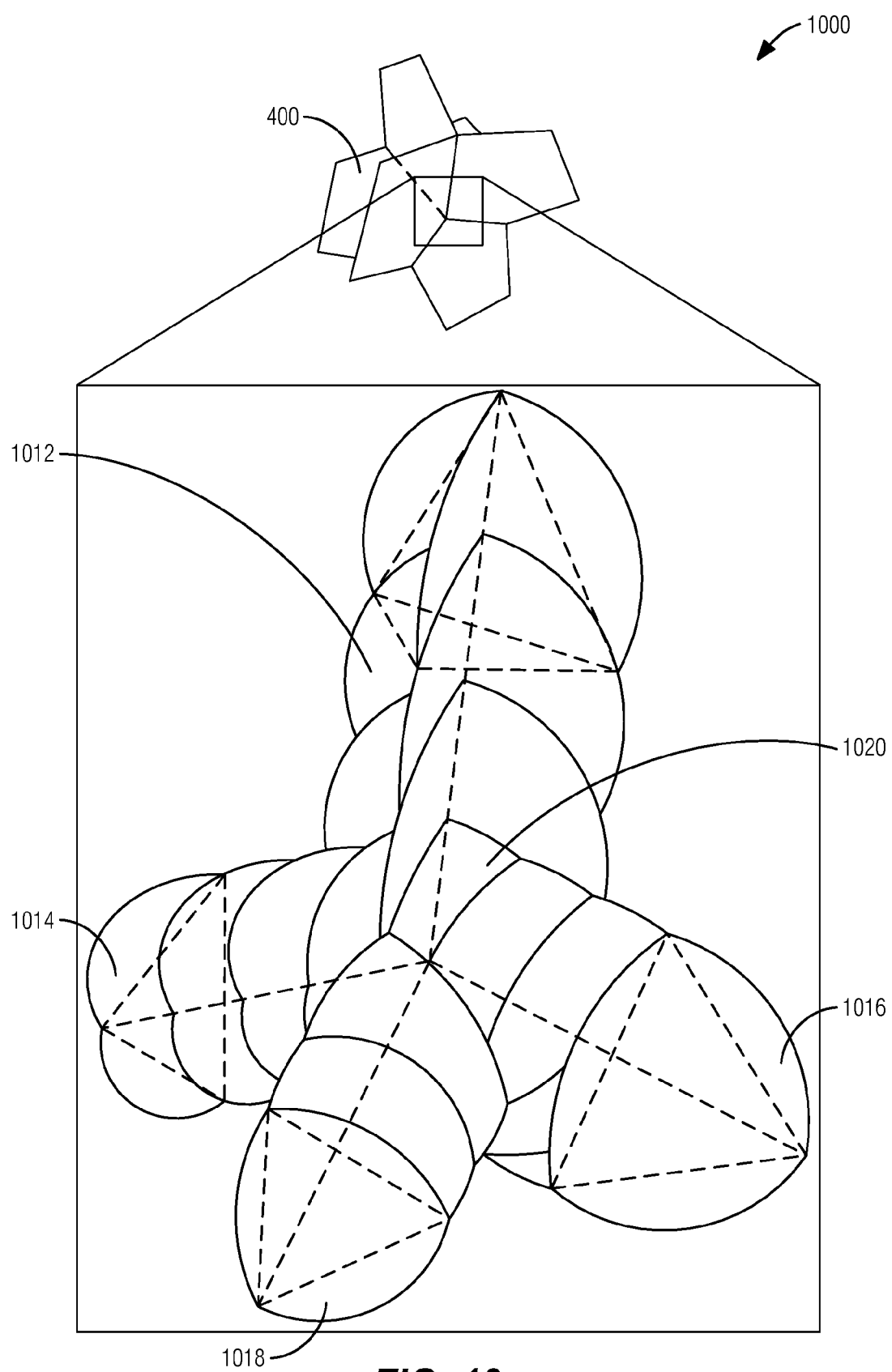
FIG. 10 is a perspective view of multiple tetrahedral building blocks combined to form an extended tetrahedral structure.

FIG. 10 is a perspective view of multiple tetrahedral building blocks combined to form an extended tetrahedral structure 1000. The extended tetrahedral structure 1000 may include four branches of tetrahedral building blocks with collapsed sides 1012, 1014, 1016, and 1018, and one base tetrahedral building block 1020 with no collapsed sides. The extended tetrahedral structure 1000 may form an interior of a structure, such as the six-sided 3-D geometric structure 400 shown in FIG. 4B. Additional nested tetrahedral building blocks may be used to form all of the edges and vertices of the six-sided 3-D geometric structure 400, such as is shown in FIG. 11.

Figure 11:
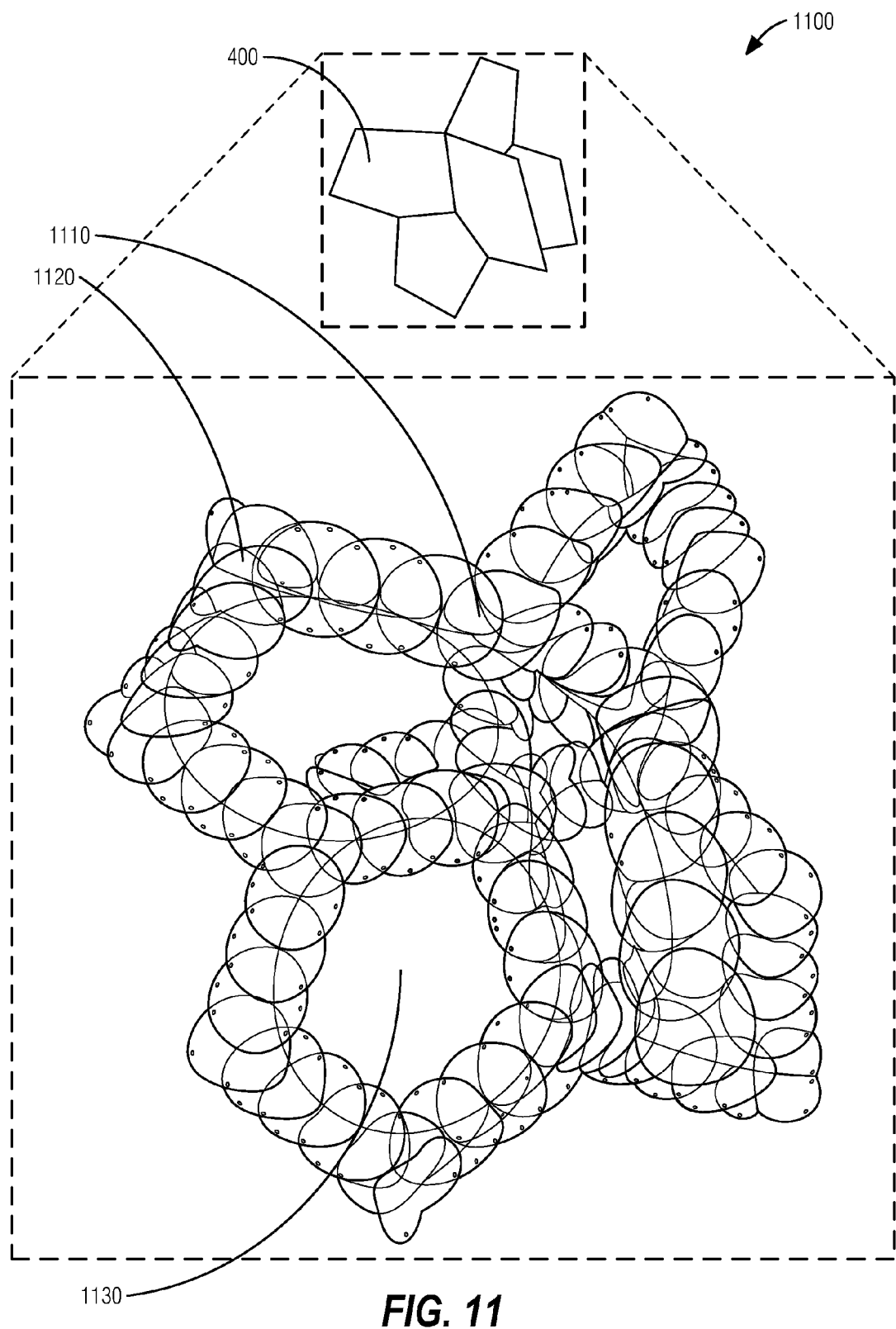
FIG. 11 is a perspective view of a tetrahedrally supported six-sided 3-D geometric structure.

FIG. 11 is a perspective view of a tetrahedrally supported six-sided 3-D geometric structure 1100. Each of the four branches of tetrahedral building blocks shown in FIG. 10 may be extended to form a new four-branch vertex, such as at four-branch vertex 1110. From each of the four-branch vertices at the ends of the four branches, additional tetrahedral building blocks may be used to extend additional branches to a two-branch vertex, such as at two-branch vertex 1120. This structure may be used to form the edges for a structure, such as the six-sided 3-D geometric structure 400 shown in FIG. 4B. Each of the planar surfaces within the tetrahedrally supported six-sided 3-D geometric structure 1100 may be pentangular, and may be supported by one or more substantially planar pentangular reinforcements or circular reinforcements, such as shown at circular inner surface 1130.

Figure 12A:
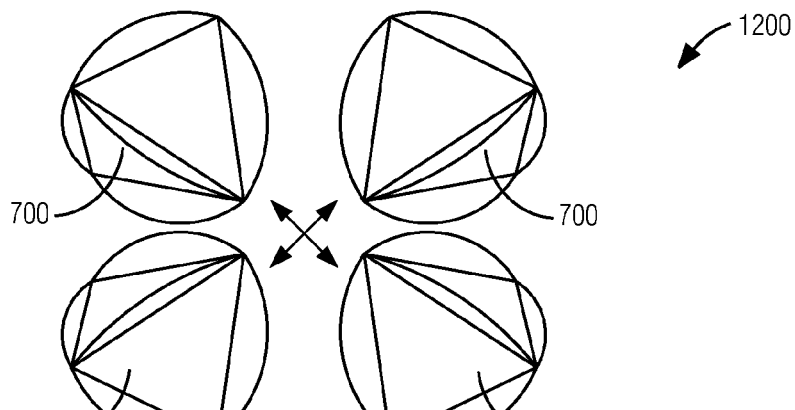
FIGS. 12A-12C are perspective views of combining four tetrahedral building blocks to form a neutral converter.
Figure 12B:
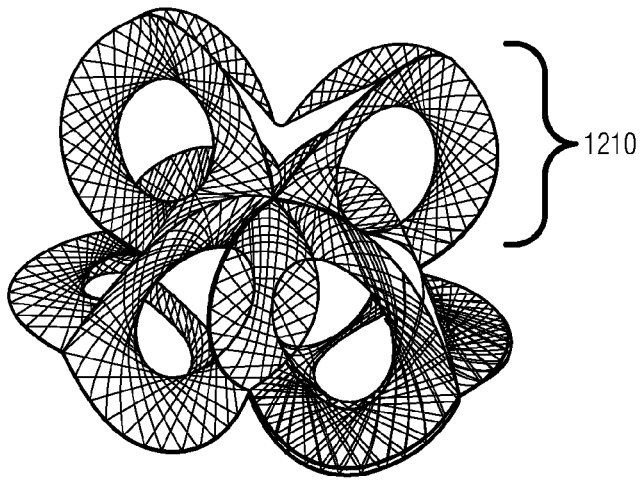
Figure 12C:
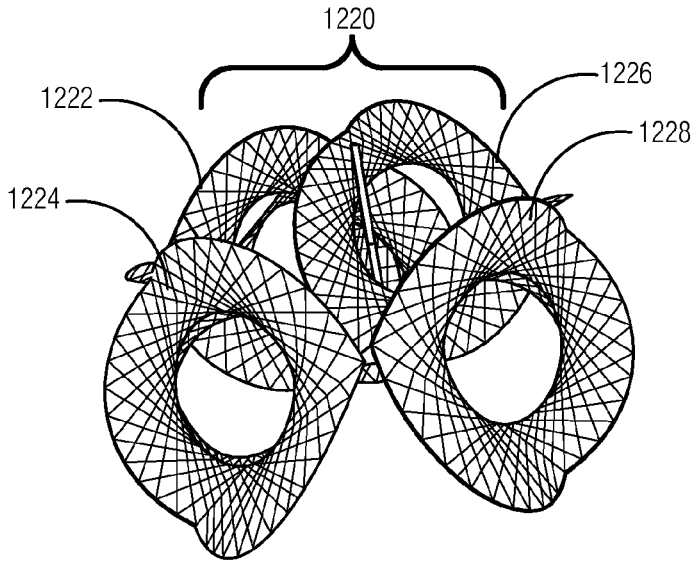

FIGS. 12A-12C are perspective views of combining four tetrahedral building blocks to form a neutral converter 1200. The tetrahedral building blocks 700 shown in FIG. 12A may be connected at a single vertex to form a rigid or semirigid neutral converter 1200. Alternatively, the rigid or semirigid neutral converter 1200 may be formed by arranging the tetrahedral building blocks 700 so that their vertices and flanges meet as shown in FIG. 12B, for example by connecting various tetrahedral building block flanges to the triangular surfaces of neighboring tetrahedral building blocks 700, such as is shown in FIG. 12B. The tetrahedral building blocks 700 may be connected via mechanical, magnetic, or by other means. For example, a magnetic flange may adhere to a magnetic triangular surface or inner volume, such as shown in FIG. 8.

A neutral converter 1200 top view is shown in FIG. 12B. One portion of one or more of the tetrahedral building blocks may extend beyond the central portion of the neutral converter 1200, and may be used to connect with various other structures. For example, the three exposed flanges 1210 may be used to fit within the hexagonal inner space of the turbine connector 1400 shown in FIG. 14B.

A neutral converter 1200 bottom view is shown in FIG. 12C. The inner space formed at the connection of the tetrahedral building blocks 700 may form a square pyramid inner space 1220. Flanges 1222, 1224, 1226, or 1228 may extend beyond the four sides of the square pyramid inner space 1220. A neutral converter 1200 may be connected using flanges 1222, 1224, 1226, or 1228 to another neutral converter 1200 to form a positive universal joint as shown in FIGS. 13A-13B.

Figure 13A:
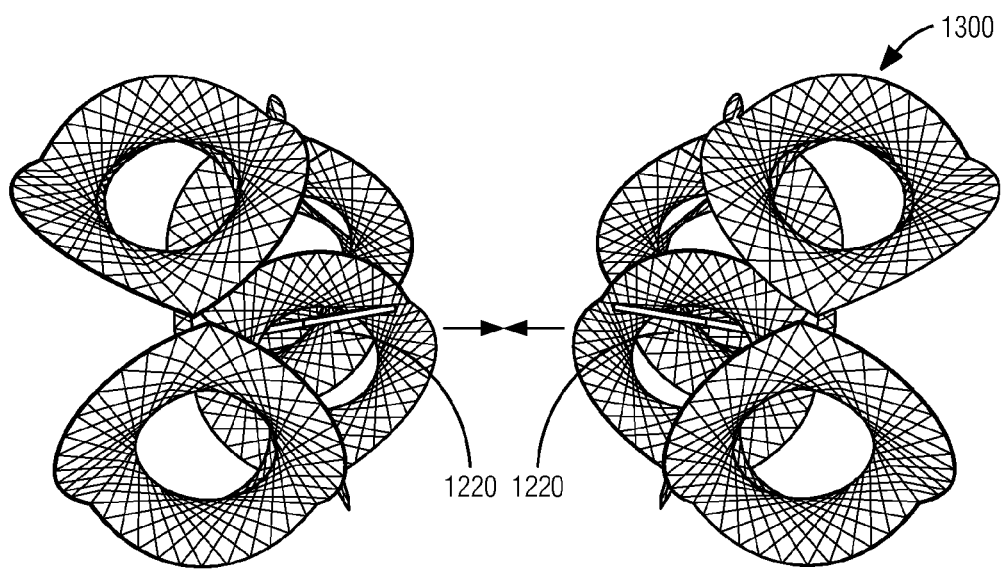
FIGS. 13A-13B are perspective views of combining two neutral converters to form a positive universal joint.
Figure 13B:
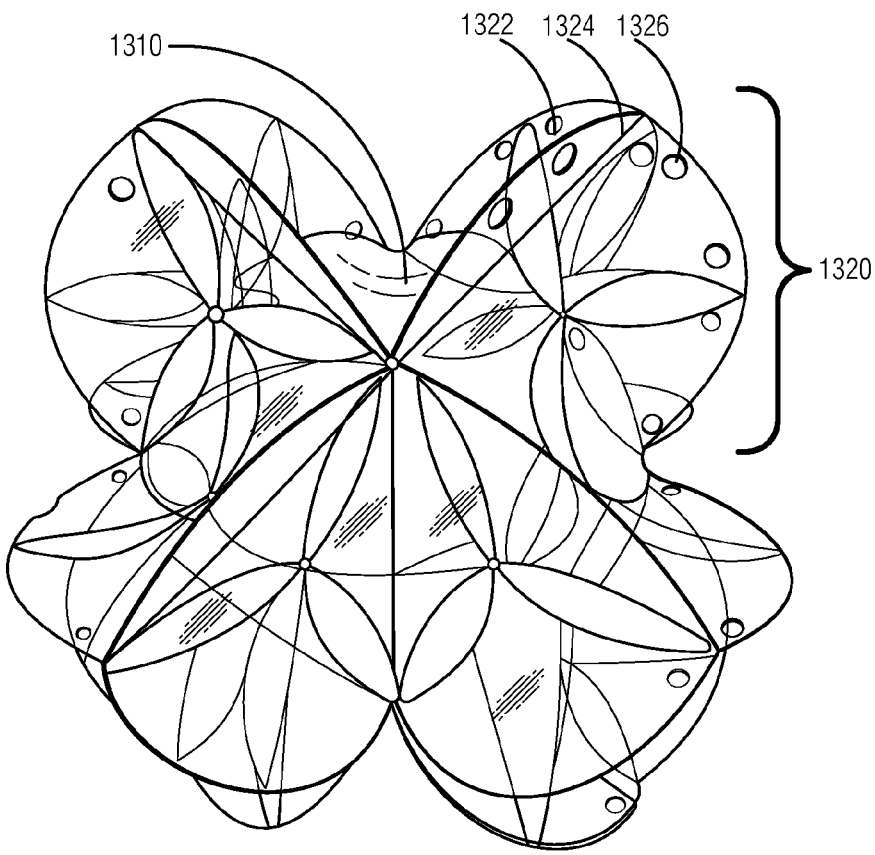

FIGS. 13A-13B are perspective views of combining two neutral converters to form a positive universal joint 1300. The square pyramid inner space 1220 of two neutral converters 1200 may be mated, as shown in FIG. 13A. The flanges of these two neutral converters 1200 may be connected to form a rigid or semirigid positive universal joint 1300. Within the positive universal joint 1300, the square pyramid inner space of each neutral converter 1200 may combine to form an octahedral inner space 1310. One portion of one or more of the tetrahedral building blocks 1320 may project from the positive universal joint 1300, and may be used to connect with various other structures. For example, the three exposed flanges 1322, 1324, and 1326 may be used to fit within the hexagonal inner space of the turbine connector 1400 shown in FIG. 14B.

Figure 14A:
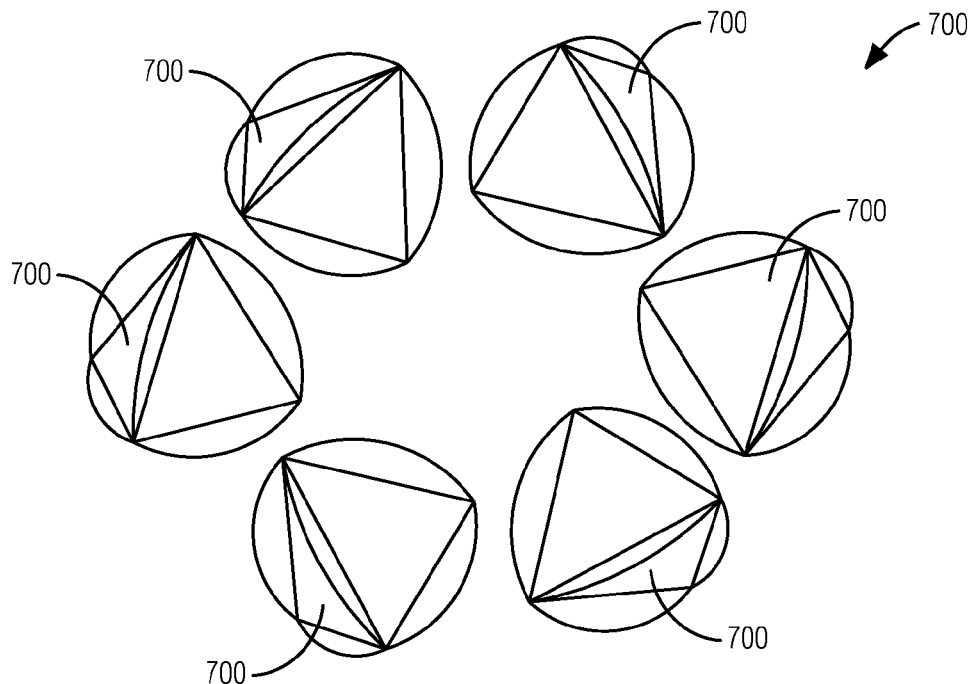
FIGS. 14A-14B are perspective views of combining six tetrahedral building blocks to form a turbine connector.
Figure 14B:
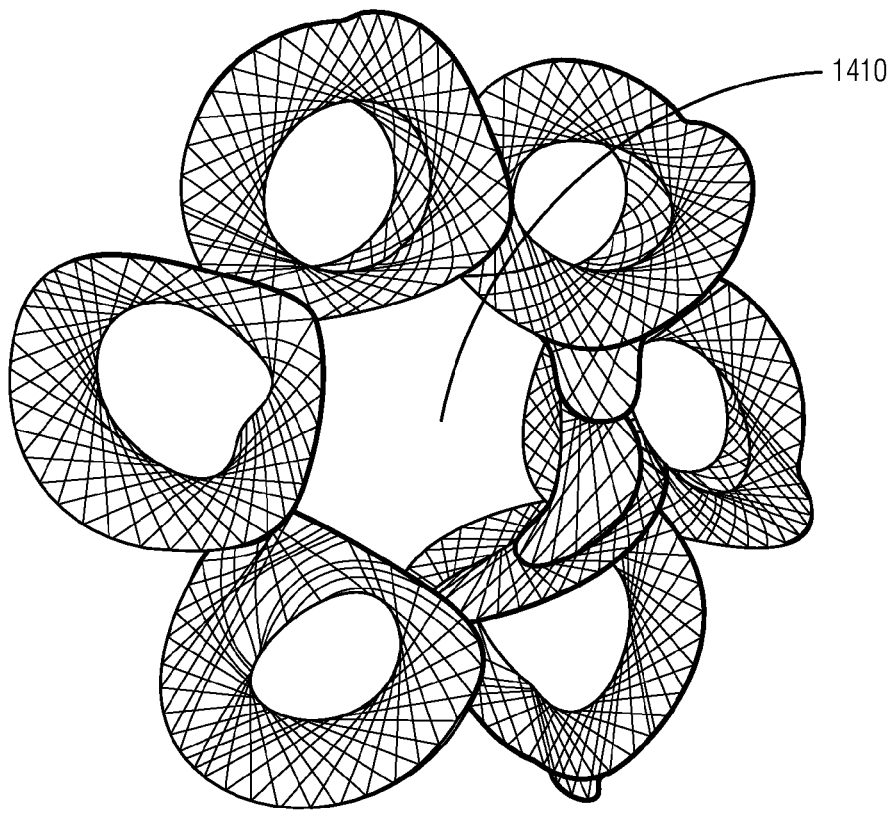

FIGS. 14A-14B are perspective views of combining six tetrahedral building blocks to form a turbine connector 1400. Six tetrahedral building blocks 700 may be rotated and combined on two or more flanges to form a rigid or semirigid turbine connector 1400, as shown in FIG. 14A. The tetrahedral building blocks 700 may be combined in a consistent orientation to form a hexagonal inner space 1410, as shown in FIG. 14B. The turbine connector 1400 may be placed on a positive universal joint 1300, where the hexagonal inner space 1410 of the turbine connector 1400 may mate with the three flanges 1322, 1324, and 1326 of a tetrahedral building blocks 700 projecting from a positive universal joint 1300.

Figure 15A:
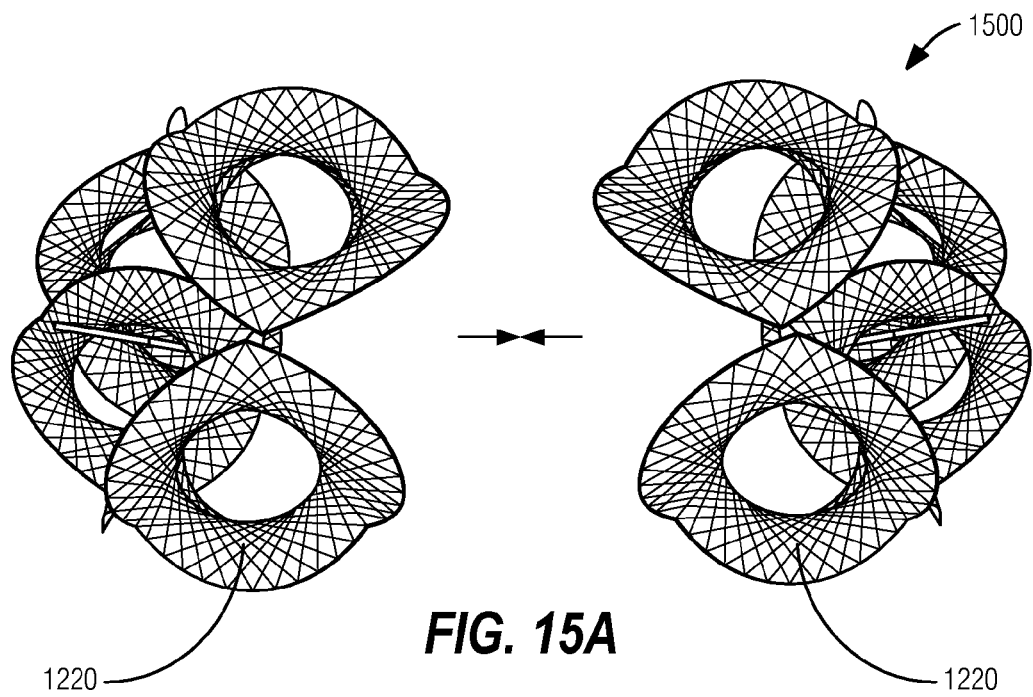
FIGS. 15A-15B are perspective views of combining two neutral converters to form a negative universal joint.
Figure 15B:
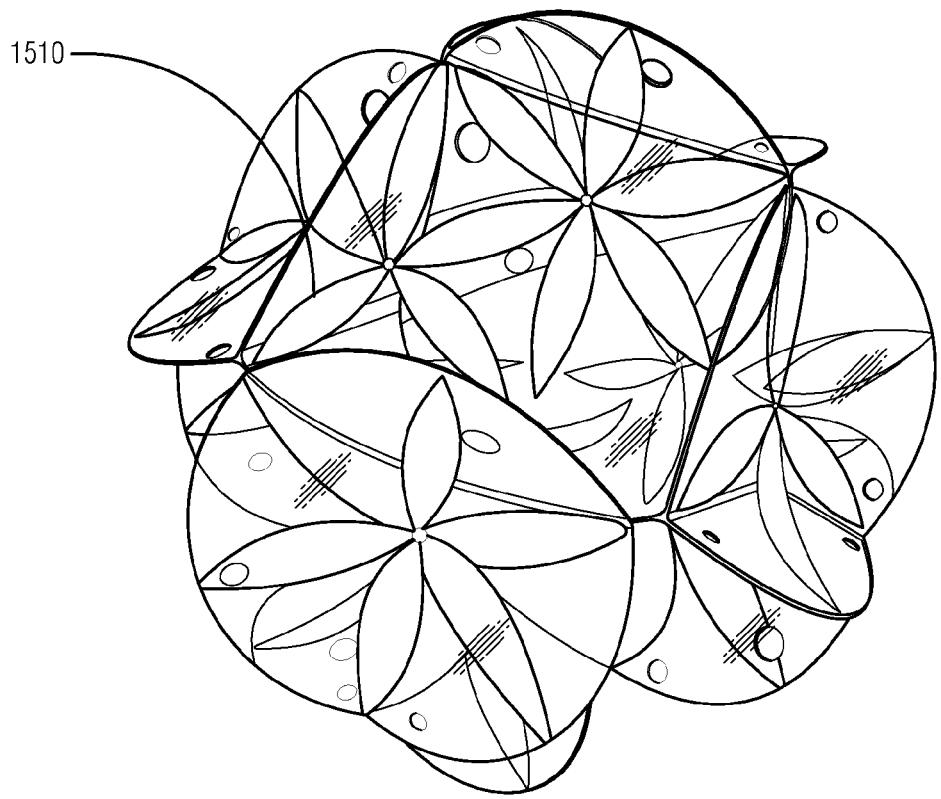

FIGS. 15A-15B are perspective views of combining two neutral converters to form a negative universal joint 1500. The square pyramid inner space 1220 of two neutral converters 1200 may be arranged in opposite directions, as shown in FIG. 13A, and one or more of the adjacent flanges may be connected to form a rigid or semirigid negative universal joint 1500. Within the negative universal joint 1500, the square pyramid inner space of each neutral converter 1200 may be arranged to be on the outside of the negative universal joint 1500, such as the square pyramid inner space 1510 shown in FIG. 15B. A negative universal joint 1500 may be combined with an additional neutral converter 1200, where the flanges of two square pyramid inner spaces may be connected, and the square pyramid inner space of each neutral converter 1200 may combine to form a rigid or semirigid hybrid positive-negative universal joint. One or more of the constituent tetrahedral building blocks 700 may project from the hybrid positive-negative universal joint, and may be combined with the turbine connector shown in FIGS. 14A-14B.

Figure 16A:
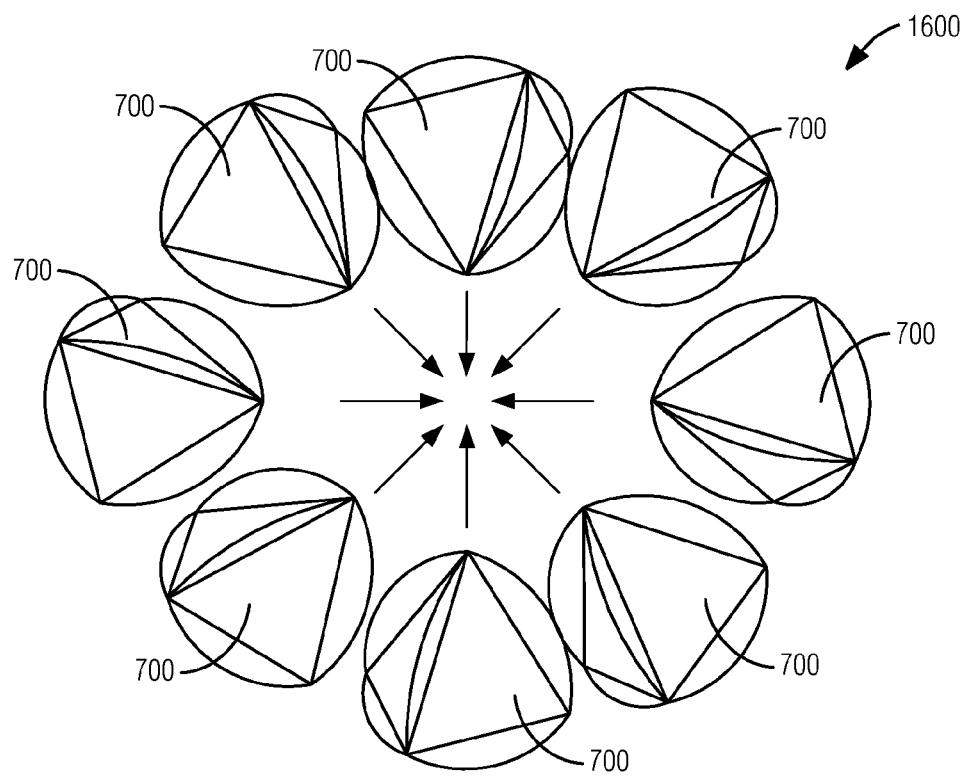
FIGS. 16A-16B are perspective views of combining eight tetrahedral building blocks to form a phase capacitor coupling.
Figure 16B:
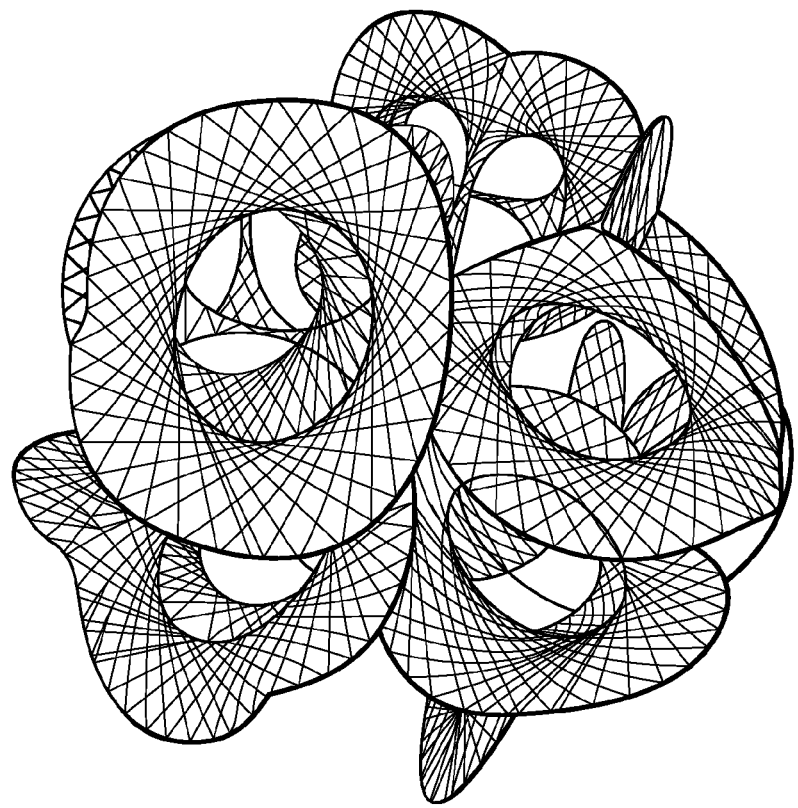

FIGS. 16A-16B are perspective views of combining eight tetrahedral building blocks to form a phase capacitor coupling 1600. The tetrahedral building blocks 700 shown in FIG. 16A may be loosely connected at a single vertex or flange to form a flexible phase capacitor coupling 1600 shown in FIG. 16B. In contrast to the rigid or semirigid structure in the neutral converter 1200, positive universal joint 1300, turbine connector 1400, or negative universal joint 1500, the tetrahedral building blocks 700 within the phase capacitor coupling 1600 can move freely with respect to each other. The constituent tetrahedral building blocks 700 may be connected using various tetrahedral building blocks flanges, using a flexible wire, using magnetic elements, or using other flexible connections. Eight tetrahedral building blocks 700 may be loosely connected to form a symmetrical phase capacitor coupling 1600, though a different number of tetrahedral building blocks 700 may be used.

In various embodiments, the collapsible structures or tetrahedral building blocks may be transparent, may be translucent, may include a semi-transparent material comprised of a color, or may include a solid (e.g., opaque) material. One or more light emitting diodes (LEDs) may be embedded within a planar surface. For example, LEDs may be connected to electrically conductive grid lines within the planar surfaces, and may receive power through the grid lines. Power may be provided to the LEDs through a power storage element (e.g., capacitor, battery) or through a power-generating element (e.g., solar cell, piezoelectric component). The electrically conductive grid lines may conduct power to the LEDs for lighting purposes. For example, the six-sided 3-D geometric structure 400 shown in FIG. 4B or the modified dodecahedron 600 shown in FIG. 6 may be used as a light fixture.

The electrically conductive grid lines may conduct power to the LEDs for educational purposes. For example, two enhanced devices may detect proximity using a magnetic or other proximity detection mechanism, and the proximity detection may convey power to the LEDs to indicate that the enhanced devices have been placed in the correct arrangement. The electrically conductive grid lines may serve as contour lines for educational purposes. For example, a two-dimensional surface with a grid pattern may be used to form one or more curved planar surfaces, and the curved planar surfaces will exhibit a visual distortion of the grid pattern according to the curvature of each surface. In another example, one or more planar surfaces may be formed using organic light emitting diodes (OLEDs) or liquid crystal displays (LCDs), and may display various human-readable or machine-readable information.

The collapsible structure may alter its appearance based on the presence of electrical current, an electric or magnetic field, sound vibration, or other external force. The collapsible structure may include one or more piezoelectric component, and this piezoelectric component may convert between mechanical and electrical inputs. A quartz piezoelectric element may be included at each of the vertices in the collapsible structure, and may be used to generate power for one or more LEDs. For example, sound vibration may be received through a planar surface or directly at a piezoelectric element, and the piezoelectric element may cause one or more LEDs to alter color or intensity according to the pattern of received sound vibration.

The piezoelectric element may be used for educational purposes. For example, two enhanced devices may detect proximity using a magnetic or other proximity detection mechanism, and the proximity detection may convey power to the piezoelectric element to generate a sound to indicate that the enhanced devices have been placed in the correct arrangement. One or more mechanical or electromechanical resonant devices may be used to modify, propagate, amplify, or mitigate externally applied vibration. For example, a mechanical tuning fork may be used to amplify vibration induced in a piezoelectric element.

In some embodiments, using electrochemical materials, application of an electrical current may transition one or more surfaces of the collapsible structure to translucent, clouded, or colored. A solid collapsible structure may be used to conduct vibration, such as in acoustic or other applications. For example, induced mechanical vibration may be used in vibration therapy. The collapsible structure may be constructed using a conductive material for various electrical applications. For example, one or more of the faces of the collapsible structure may be comprised of silicon, where the silicon is arranged to function as a resistor, inductor, capacitor, transistor, complete microchip (e.g., integrated circuit), or other electrical component. Multiple collapsible structures or tetrahedral building blocks may be arranged to propagate conducted vibration. For example, a mechanical vibration may be generated by applying an electric current to a piezoelectric element in a first structure, and this vibration may be conducted by the second structure and converted to an electrical impulse.

The collapsible structure may be made of a transparent material, and may be of a uniform or nonuniform thickness. The collapsible structure may include one or more photovoltaic cells, and may be used in solar power applications. For example, the cross-section of the collapsible structure may be convex or concave, and may be used as a lens in various optical applications. The collapsible structure may include various color patterns. Various additional ornamental designs may be used on each side of the collapsible structure. Various designs may include lines comprised of magnetic tape, where information may be encoded or transferred using the magnetic tape. For example, standard magnetic tape encoders and readers may be used to record or read information encoded on a magnetic tape stripe on an exterior surface. Various designs may include lines comprised of electrically conductive materials, such as copper. The collapsible structure may be constructed using a flexible material to allow the three faces to expand or contract.

The lines within each enhanced device may be uniformly distributed. For example, a circular enhanced template may include a series of arcs radiating from the circle center to the circle radius, where each arc is spaced apart from adjacent arcs by forty-five degrees. Enhanced devices corresponding to this circular two-dimensional enhanced template may have corresponding arc portions, and the arc portions may aid the user in arranging the enhanced devices on the template. In other embodiments, the grid lines may be irregular in shape or spacing, may be configured in a fractal pattern, or may be configured in another arrangement.

The inner space may include one or more gasses, such as noble gasses or gasses that are translucent or colored. The inner space may include one or more fluids (e.g., gasses or liquids). The fluid may be selected according to its response to heating or cooling. In another example, a fluid with a high heat capacity may store energy received from solar heating, such as in concentrated solar power applications. The fluid may be selected according to its ability to change color or light absorption. For example, a suspended particle fluid may transition from a clouded appearance to a translucent appearance in the presence of an electrical voltage. Various levels of transparency or various shades of color may be used. The use of semi-transparent materials of various colors may allow the colors to be combined depending on orientation. For example, if the device is held so a blue face is superimposed on a yellow face, the object may appear green. Similarly, multiple collapsible structures or tetrahedral building blocks may be combined to yield various colors. Multiple collapsible structures or tetrahedral building blocks may be combined to form the appearance of various platonic solids, where the platonic solid appearance may depend on each collapsible structure's specific periodicities of motion and wave positions in time as indicated by the direction of particular intersecting linear projections. For example, the vertices of multiple collapsible structures or tetrahedral building blocks may be combined to form a larger enhanced device.

The planar shapes may be collapsed or opened fully or partially through various methods. The planar shapes may be collapsed or opened by various active mechanical or electromechanical devices. These devices may include hydraulic actuators, servos, or other mechanical or electromechanical means. For example, the planar shapes or inner tetrahedral surfaces may contain magnetic or electromagnetic material, and one or more electromagnets may be energized selectively to collapse or open one or more planar shapes. An electromagnetic field may be used to cause movement of one or more planar shapes, or may be used to arrange two or more enhanced devices in a predetermined configuration. In embodiments where the planar shapes define an inner volume, the planar shapes may be collapsed or opened by heating or cooling a fluid (e.g., increasing or decreasing molecular vibration) contained within the enhanced device. For example, the fluid may be heated using solar energy, and the expanding fluid may fill the planar shapes and cause them to open. The planar shapes may be collapsed or opened by various passive methods, such as collapsing and opening opposing planar shapes alternatingly in response to a fluid. For example, a moving fluid such as wind may open a flange and cause the enhanced device to rotate around its axis of symmetry, and as the flange rotates into the wind, the wind may collapse that flange.

In some embodiments, the surfaces may also be collapsed or removed to allow nesting (e.g., stacking) of two or more collapsible structures or tetrahedral building blocks. Two or more collapsible structures or tetrahedral building blocks may be nested, and may be connected at one or more connection points via mechanical, magnetic, or by other means. For example, a magnetic flange may adhere to magnetic inner volume. Multiple enhanced devices may be nested on one or more of the vertices of the contracted triangular faces. For example, multiple devices may be nested on the three bottom vertices to form a tripod configuration, and multiple devices may be nested on the top vertex to form a vertical column. In an additional example, a second nested tripod configuration could be arranged on the vertical column, where each of the three tripod legs serves as a counterbalance for the other two tripod legs. Enhanced devices may be designed asymmetrically so that a series of collapsible structures or tetrahedral building blocks may be connected to form a circle, polygon, or other shape. Any combination of nested enhanced devices may be used to form larger structures. Nested enhanced structures may be expanded or reinforced by adding additional shapes.

Additional embodiments using regular polygons may have a number of sides that are integer multiples of three, including the hexagon with sixty degree interior angles, a twelve-sided dodecahedron with thirty degree interior angles, a twenty-four sided icosikaitetragon with fifteen degree interior angles, et cetera. Different three-dimensional collapsible structures or tetrahedral building blocks may be formed using any three or more two-dimensional shapes, including any combination of arbitrary shapes or regular or irregular close-chain polygons.

In some embodiments, multiple collapsible structures or tetrahedral building blocks may be connected to form a closed chain polygon (e.g., triangle, square, pentagon, etc.). The structures may be connected to each other by magnetic means, by soldering, or by other means. Alternatively, the collapsible structures or tetrahedral building blocks may be connected to a center hub using one or more spokes per collapsible structure. The connected structures may be configured to rotate around the center hub, such as in response to a fluid flow (e.g., gas or liquid). For example, the connected structures may be used in a turbine configuration, where each collapsible structure is configured to spill and catch air depending on the angles of the planar shapes and orientations of the enhanced devices to cause the connected collapsible structures or tetrahedral building blocks to rotate. As another example, the connected structures may be used in a water wheel configuration, where water may contact outer planar shapes and cause the connected structures to rotate. The structures may be adjusted to change the angular velocity, rotational direction, or other response of the connected structures to movement of a fluid across the surface of the enhanced devices. Adjustments may include collapsing or opening individual planar shapes, or extending or retracting the respective structures relative to the hub. In embodiments where the structures are formed from or include a framework comprised of a conductive material, the connected structures may be arranged to form an antenna, such as for terrestrial or satellite communication. The connected structures may be used to conduct vibration, such as in acoustic applications, vibration therapy, or other applications. Other hydrodynamic or aerodynamic applications may be used. In addition to these macroscopic applications for a single or multiple collapsible structures or tetrahedral building blocks, collapsible structures or tetrahedral building blocks may be used in various microscopic applications such as nanotechnology. For example, multiple microscopic collapsible structures or tetrahedral building blocks may be configured to arrange themselves in a predefined structure in the presence of a magnetic field. Similarly, multiple microscopic collapsible structures or tetrahedral building blocks may be permanently arranged in a microscopic structure with predetermined properties, such as a resistor, inductor, capacitor, transistor, complete microchip, or other electrical component.

Example 1 includes a six-sided pentagonal structure comprising a first subgroup including a first, second, and third substantially pentagonal structure, the first, second, and third substantially pentagonal structures arranged to share a first common edge and at least a first common vertex with approximately one hundred and twenty degrees between adjacent substantially pentagonal structures, and a second subgroup including a fourth, fifth, and sixth substantially pentagonal structures, the fourth, fifth, and sixth substantially pentagonal structures arranged to share a second common vertex and a second, third, and fourth common edge with adjacent substantially pentagonal structures in the second subgroup, wherein the first and second subgroups are arranged such that the first common vertex is collocated with the second common vertex, and the first subgroup first, second, and third substantially pentagonal structures is arranged to share an edge with the second subgroup second, third, and fourth common edges, respectively.

Example 2 includes the subject matter of Example 1, further including a plurality of tetrahedral vertex structural supports to support a pentagonal vertex connection at each vertex of the first, second, third, fourth, fifth, and sixth substantially pentagonal structures.

Example 3 includes the subject matter of any of Examples 1-2, further including a plurality of three-sided edge structural supports to support a plurality of pentagonal edge connections at each edge of the first, second, third, fourth, fifth, and sixth substantially pentagonal structures.

Example 4 includes the subject matter of any of Examples 1-3, wherein the plurality of tetrahedral vertex structural supports and the plurality of three-sided edge structural supports are configured to allow at least one of the substantially pentagonal structures to collapse toward an adjacent substantially pentagonal structure.

Example 5 includes the subject matter of any of Examples 1-4, further including magnetic material embedded in at least one of the substantially pentagonal structures to provide structural support for the six-sided pentagonal structure.

Example 6 includes the subject matter of any of Examples 1-4, further including electromagnetic material embedded in at least one of the substantially pentagonal structures.

Example 7 includes the subject matter of any of Examples 1-6, wherein the electromagnetic material is configured, in response to receiving power, to cause at least one of the sixth substantially pentagonal structures to collapse toward an adjacent substantially pentagonal structure.

Example 8 includes the subject matter of any of Examples 1-7, further including a piezoelectric element embedded in at least one of the substantially pentagonal structures configured to generate an electric charge in response to vibration.

Example 9 includes the subject matter of any of Examples 1-7, wherein the piezoelectric element is electrically connected to the electromagnetic material and configured to cause at least one of the sixth substantially pentagonal structures to collapse toward an adjacent substantially pentagonal structure in response to the electric charge generated by piezoelectric element.

Example 10 includes the subject matter of any of Examples 1-8, further including a light emitting diode embedded in at least one of the substantially pentagonal structures and electrically connected to the piezoelectric element, wherein the light emitting diode is configured to provide electroluminescence in response to the electric charge generated by piezoelectric element.

Example 11 includes the subject matter of any of Examples 1-10, wherein the light emitting diode is a substantially planar organic light emitting diode.

Example 12 includes the subject matter of any of Examples 1-11, further including a first acoustic resonator embedded in at least one of the substantially pentagonal structures to induce a vibration in the piezoelectric element.

Example 13 includes the subject matter of any of Examples 1-12, wherein the first acoustic resonator is tuned to resonate at a selected frequency, and the first acoustic resonator is configured to resonate sympathetically with a second acoustic resonator, and wherein the second acoustic resonator is external to the six-sided pentagonal structure.

Example 14 includes the subject matter of any of Examples 1-6, wherein the electromagnetic material is configured, in response to receiving power, to generate a magnetic field directed in a selected direction.

Example 15 includes the subject matter of Example 1, further including at least one electrically conductive line embedded in at least one of the substantially pentagonal structures, wherein the at least one electrically conductive line is configured to convey power or generate an electromagnetic field.

Example 16 includes the subject matter of Example 1, wherein the second subgroup is arranged to be connected to a first, second, and third external subgroups corresponding to a first, second, and third external six-sided pentagonal structure to form a substantially regular dodecahedron.

Example 17 includes the subject matter of Example 1, further including a plurality of tetrahedral vertex structural supports to support a dodecahedron vertex connection at each vertex of the a substantially regular dodecahedron.

Example 18 includes the subject matter of any of Examples 1-14, further including a plurality of three-sided edge structural supports to support a plurality of dodecahedron edge connections at each edge of the substantially regular dodecahedron.

Example 19 includes a method of making a six-sided pentagonal structure comprising mounting a first, second, and third substantially pentagonal structure to share a first common edge and at least a first common vertex with approximately one hundred and twenty degrees between adjacent substantially pentagonal structures to form a first pentagonal subgroup, mounting a fourth, fifth, and sixth substantially pentagonal structures to share a second common vertex and a second, third, and fourth common edge with adjacent substantially pentagonal structures in the second subgroup to form a second pentagonal subgroup, and mounting the first pentagonal subgroup on the second pentagonal subgroup to collocate the first common vertex with the second common vertex and to share an edge on the first, second, and third substantially pentagonal structures with an edge on the second subgroup second, third, and fourth common edges, respectively.

Example 20 includes the subject matter of Example 19, further including mounting a plurality of tetrahedral vertex structural supports to support a pentagonal vertex connection at each vertex of the first, second, third, fourth, fifth, and sixth substantially pentagonal structures, and mounting a plurality of three-sided edge structural supports to support a plurality of pentagonal edge connections at each edge of the first, second, third, fourth, fifth, and sixth substantially pentagonal structures.

Example 21 includes a collapsible structure comprising a plurality of substantially planar surfaces hingedly connected, a ferromagnetic component fixedly attached to at least one of the plurality of substantially planar surfaces, an electromagnetic component fixedly attached to at least one of the plurality of substantially planar surfaces, wherein the applying a current to the electromagnetic component causes the electromagnetic component to be attracted to the ferromagnetic component, and causes the plurality of substantially planar surfaces to form a selected three-dimensional shape.

This invention is intended to cover all changes and modifications of the example embodiments described herein that do not constitute departures from the scope of the claims.

What is claimed is:

1. A six-sided pentagonal structure comprising:
a first three-sided subgroup joined to a second three-sided subgroup, the first subgroup including first, second, and third substantially pentagonal structures, the first, second, and third substantially pentagonal structures arranged to share a first common edge and at least a first common vertex with approximately one hundred and twenty degree angles between adjacent substantially pentagonal structures;
the second subgroup including fourth, fifth, and sixth substantially pentagonal structures; wherein:
the fourth, fifth, and sixth substantially pentagonal structures are arranged to share a second common vertex;
the fourth and fifth substantially pentagonal structures are arranged to share a second common edge;
the fifth and sixth substantially pentagonal structures are arranged to share a third common edge;
the fourth and sixth substantially pentagonal structures are arranged to share a fourth common edge;
wherein the first and second subgroups are joined such that:
the first common vertex is collocated with the second common vertex;

the first substantially pentagonal structure shares an edge with the second common edge;

the second substantially pentagonal structure shares an edge with the third common edge; and the third substantially pentagonal structure shares an edge with the fourth common edge.

2. The six-sided pentagonal structure of claim 1, further including a first plurality of tetrahedral vertex structural supports at each vertex of the first, second, third, fourth, fifth, and sixth substantially pentagonal structures, wherein the first plurality of tetrahedral vertex structural supports is configured to support a relative position of adjacent substantially pentagonal structures.

3. The six-sided pentagonal structure of claim 2, further including a first plurality of three-sided edge structural supports at each edge of the first, second, third, fourth, fifth, and sixth substantially pentagonal structures, wherein the first plurality of three-sided edge structural supports is configured to support a relative position of adjacent substantially pentagonal structures.

4. The six-sided pentagonal structure of claim 3, wherein the plurality of tetrahedral vertex structural supports and the plurality of three-sided edge structural supports are configured to allow at least one of the substantially pentagonal structures to collapse toward an adjacent substantially pentagonal structure.

5. The six-sided pentagonal structure of claim 4, further including magnetic material embedded in at least one of the substantially pentagonal structures to provide structural support for the six-sided pentagonal structure.

6. The six-sided pentagonal structure of claim 4, further including electromagnetic material embedded in at least one of the substantially pentagonal structures.

7. The six-sided pentagonal structure of claim 6, wherein the electromagnetic material is configured, in response to receiving power, to cause at least one of the sixth substantially pentagonal structures to collapse toward an adjacent substantially pentagonal structure.

8. The six-sided pentagonal structure of claim 7, further including a piezoelectric element embedded in at least one of the substantially pentagonal structures configured to generate an electric charge in response to vibration.

9. The six-sided pentagonal structure of claim 7, wherein the piezoelectric element is electrically connected to the electromagnetic material and configured to cause at least one of the sixth substantially pentagonal structures to collapse toward an adjacent substantially pentagonal structure in response to the electric charge generated by piezoelectric element.

10. The six-sided pentagonal structure of claim 8, further including a light emitting diode embedded in at least one of the substantially pentagonal structures and electrically connected to the piezoelectric element, wherein the light emitting diode is configured to provide electroluminescence in response to the electric charge generated by piezoelectric element.

11. The six-sided pentagonal structure of claim 10, wherein the light emitting diode is a substantially planar organic light emitting diode.

12. The six-sided pentagonal structure of claim 8, further including a first acoustic resonator embedded in at least one of the substantially pentagonal structures to induce a vibration in the piezoelectric element.

13. The six-sided pentagonal structure of claim 12, wherein:
the first acoustic resonator is tuned to resonate at a selected frequency; and the first acoustic resonator is configured to resonate sympathetically with a second acoustic resonator, and wherein the second acoustic resonator is external to the six-sided pentagonal structure.

14. The six-sided pentagonal structure of claim 6, wherein the electromagnetic material is configured, in response to receiving power, to generate a magnetic field directed in a selected direction.

15. The six-sided pentagonal structure of claim 1, further including at least one electrically conductive line embedded in at least one of the substantially pentagonal structures, wherein the at least one electrically conductive line is configured to convey power or generate an electromagnetic field.

16. The six-sided pentagonal structure of claim 1, wherein the second subgroup is arranged to be connected to a first, second, and third external subgroups corresponding to a first, second, and third external six-sided pentagonal structure to form a substantially regular dodecahedron.

17. The six-sided pentagonal structure of claim 16, further including a second plurality of tetrahedral vertex structural supports at each vertex of the a substantially regular dodecahedron, wherein the second plurality of tetrahedral vertex structural supports is configured to support adjacent substantially pentagonal structures within the substantially regular dodecahedron.

18. The six-sided pentagonal structure of claim 14, further including a second plurality of three-sided edge structural supports at each edge of the substantially regular dodecahedron, wherein the second plurality of three-sided edge structural supports is configured to support adjacent substantially pentagonal structures within the substantially regular dodecahedron.

19. A method of making a six-sided pentagonal structure comprising:
mounting a first, second, and third substantially pentagonal structures to share a first common edge and at least a first common vertex with approximately one hundred and twenty degree angles between adjacent substantially pentagonal structures to form a first pentagonal subgroup;

mounting a fourth, fifth, and sixth substantially pentagonal structures to form a second pentagonal subgroup; wherein:
the fourth, fifth, and sixth substantially pentagonal structures are arranged to share a second common vertex;

the fourth and fifth substantially pentagonal structures are arranged to share a second common edge;

the fifth and sixth substantially pentagonal structures are arranged to share a third common edge; and the fourth and sixth substantially pentagonal structures are arranged to share a fourth common edge; and joining the first pentagonal subgroup to the second pentagonal subgroup, wherein:
the first common vertex is collocated with the second common vertex the first substantially pentagonal structure shares an edge with the second common edge;

the second substantially pentagonal structure shares an edge with the third common edge; and the third substantially pentagonal structure shares an edge with the fourth common edge.

20. The method of making the six-sided pentagonal structure of claim 19, further including:
mounting a third plurality of tetrahedral vertex structural supports at each vertex of the first, second, third, fourth, fifth, and sixth substantially pentagonal structures, wherein the third plurality of tetrahedral vertex structural supports is configured to support adjacent substantially pentagonal structures within the six-sided pentagonal structure; and mounting a third plurality of three-sided edge structural supports at each edge of the first, second, third, fourth, fifth, and sixth substantially pentagonal structures, wherein the third plurality of three-sided edge structural supports is configured to support adjacent substantially pentagonal structures within the six-sided pentagonal structure.

* * * * *